US010743359B2

(12) United States Patent
Bae et al.

(10) Patent No.: US 10,743,359 B2
(45) Date of Patent: Aug. 11, 2020

(54) ELECTRONIC DEVICE FOR CONNECTING WITH EXTERNAL DEVICES BASED ON CONNECTION INFORMATION AND OPERATING METHOD THEREOF

(71) Applicant: Samsung Electronics Co., Ltd., Suwon-si, Gyeonggi-do (KR)

(72) Inventors: Hyunjin Bae, Suwon-si (KR); Sejeong Na, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/264,381

(22) Filed: Jan. 31, 2019

(65) Prior Publication Data
US 2019/0246440 A1  Aug. 8, 2019

(30) Foreign Application Priority Data

Feb. 7, 2018  (KR) .................. 10-2018-0015204

(51) Int. Cl.
*H04W 76/15*  (2018.01)
*H04W 8/00*  (2009.01)
*H04W 76/18*  (2018.01)

(52) U.S. Cl.
CPC .......... *H04W 76/15* (2018.02); *H04W 8/005* (2013.01); *H04W 76/18* (2018.02)

(58) Field of Classification Search
CPC ....... H04W 76/15; H04W 8/005; H04W 4/80; H04W 76/10; H04W 76/18; H04W 12/00305; H04L 29/06734; H04L 29/08324; H04L 67/1044; H04M 2203/2044
See application file for complete search history.

(56) References Cited

U.S. PATENT DOCUMENTS 8,831,517 B2 * 9/2014 Shankaranarayanan ..................... H04L 12/1475 455/41.2
9,503,965 B2 * 11/2016 Dhanabalan ........ H04L 41/0806
(Continued)

FOREIGN PATENT DOCUMENTS

KR  10-2015-0066352 A  6/2015
WO  2016/068960 A1  5/2016
WO  2016/185507 A1  11/2016

OTHER PUBLICATIONS

International Search Report dated Apr. 29, 2019 in connection with International Patent Application No. PCT/KR2019/001217, 3 pages.
(Continued)

*Primary Examiner* — Devan A Sandiford

(57) ABSTRACT

An electronic device for connecting with external devices and an operating method thereof are provided. The electronic device includes a communication interface, and at least one processor. The processor is configured to attempt a connection with a second external device through the communication interface, based at least on group device information of a first external device connected to the electronic device, and connect with a third external device through the communication interface, based at least on a failure of connection with the second external device, and refine the group device information of the first external device, based at least on information of the connected third external device.

18 Claims, 13 Drawing Sheets

(56) References Cited

U.S. PATENT DOCUMENTS

| | | | |
|---|---|---|---|
| 9,549,240 B2 | 1/2017 | Sohn et al. | |
| 9,756,450 B1* | 9/2017 | Carrera | H04W 48/20 |
| 9,763,276 B2* | 9/2017 | Seymour | H04M 1/72519 |
| 9,788,139 B2* | 10/2017 | Kulavik | H04W 4/80 |
| 9,907,105 B2* | 2/2018 | Jales | H04W 76/14 |
| 10,028,147 B1* | 7/2018 | Coney | H04W 76/10 |
| 10,097,529 B2* | 10/2018 | Kang | H04L 63/08 |
| 2005/0240634 A1* | 10/2005 | Iwamura | G06F 11/2064 |
| 2010/0195539 A1* | 8/2010 | Tian | H04L 47/824 |
| | | | 370/255 |
| 2011/0264772 A1 | 10/2011 | Krapf et al. | |
| 2012/0198353 A1* | 8/2012 | Lee | G06F 3/017 |
| | | | 715/748 |
| 2013/0205032 A1* | 8/2013 | Polefko | H04L 63/0876 |
| | | | 709/227 |
| 2013/0252656 A1 | 9/2013 | Lee et al. | |
| 2014/0219193 A1* | 8/2014 | Linde | H04W 72/1215 |
| | | | 370/329 |
| 2014/0227975 A1* | 8/2014 | Kuroyama | G08C 17/02 |
| | | | 455/41.1 |
| 2015/0134732 A1* | 5/2015 | Cho | H04L 67/02 |
| | | | 709/203 |
| 2015/0237596 A1* | 8/2015 | Carlsson | G08G 1/0112 |
| | | | 455/456.1 |
| 2015/0373760 A1* | 12/2015 | Palin | H04W 4/80 |
| | | | 455/41.2 |
| 2015/0381671 A1* | 12/2015 | Lee | H04L 12/185 |
| | | | 709/204 |
| 2016/0037563 A1 | 2/2016 | Debates et al. | |
| 2016/0119745 A1* | 4/2016 | Choi | H04M 1/7253 |
| | | | 455/41.3 |
| 2018/0192292 A1* | 7/2018 | Coney | H04W 12/08 |
| 2018/0332629 A1* | 11/2018 | Huang | H04W 76/10 |
| 2019/0037624 A1* | 1/2019 | Tokuchi | H04W 76/15 |

OTHER PUBLICATIONS

Written Opinion of the International Searching Authority dated Apr. 29, 2019 in connection with International Patent Application No. PCT/KR2019/001217, 7 pages.

* cited by examiner

ELECTRONIC DEVICE FOR CONNECTING WITH EXTERNAL DEVICES BASED ON CONNECTION INFORMATION AND OPERATING METHOD THEREOF

CROSS-REFERENCE TO RELATED APPLICATION

This application is based on and claims priority under 35 U.S.C. § 119 to Korean Patent Application No. 10-2018-0015204, filed on Feb. 7, 2018, in the Korean Intellectual Property Office, the disclosure of which is incorporated by reference herein in its entirety.

BACKGROUND

1. Field

Various embodiments of the present disclosure relate to a method and apparatus for connecting with external devices used in a group (e.g., pair) in an electronic device.

2. Description of Related Art

With the growth of information communication technologies, semiconductor technologies, etc., a supply and use of various electronic devices are being suddenly increased. As the electronic devices are widely supplied, the electronic devices are supporting various functions in association with other electronic devices. For example, the electronic device can transmit and/or receive data with two external devices configured as pair devices through a short-range wireless communication connection, thereby providing various services to a user.

The above information is presented as background information only to assist with an understanding of the present disclosure. No determination has been made, and no assertion is made, as to whether any of the above might be applicable as prior art with regard to the present disclosure.

SUMMARY

To provide a service associated with the two external devices configured as the pair devices, the electronic device can repeatedly perform an operation of searching and connecting with a corresponding external device, based on a user input. For example, the electronic device can search and connect with a first external device, based on a first user input, and can search and connect with a second external device that is a pair device of the first external device, based on a second user input. Such a connection scheme is inefficient in that the electronic device has to repeatedly perform the same operation for each of the two external devices configured as the pair devices.

Accordingly, various embodiments of the present disclosure relate to a method and apparatus for connecting with external devices used in a pair in an electronic device.

According to various embodiments, an electronic device includes a communication interface, and at least one processor. The processor is configured to attempt a connection with a second external device through the communication interface, based at least on group device information of a first external device connected to the electronic device, and connect with a third external device through the communication interface, based at least on a failure of connection with the second external device, and refine the group device information of the first external device, based at least on information of the connected third external device.

According to various embodiments, an external device includes a communication interface, a memory for storing instructions, and at least one processor. At execution, the instructions enables the processor to connect with an electronic device through the communication interface, and receive group device information from the electronic device, through the communication interface, and refine information about a group device of the external device, based on the received group device information.

According to various embodiments, a method for operating in an electronic device includes connecting with a first external device, and attempting a connection with a second external device, based at least on group device information of the first external device, and connecting with a third external device, based at least on a failure of connection with the second external device, and refining the group device information of the first external device, based at least on information of the connected third external device.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following description with reference to the accompanying drawings is provided to assist in a comprehensive understanding of various embodiments of the disclosure as defined by the claims and their equivalents. It includes various specific details to assist in that understanding, but these are to be regarded as merely examples. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

Figure 1:
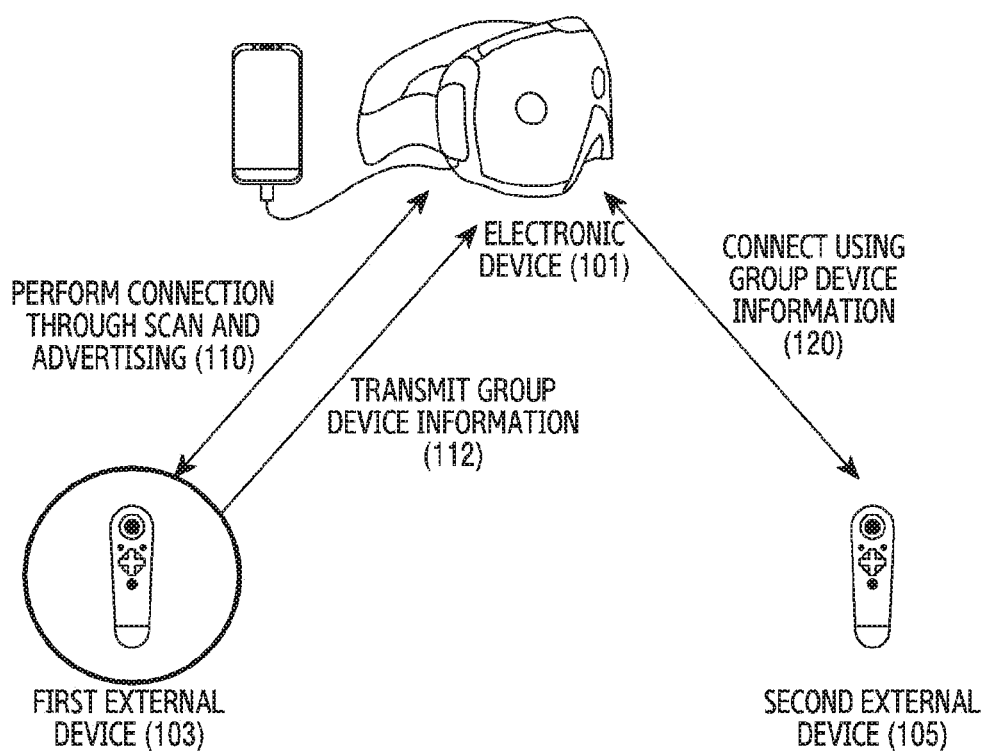
FIG. 1 illustrates a scheme of connecting with external devices used in a group in an electronic device of various embodiments.

FIG. 1 illustrates a scheme of connecting with external devices used in a group in an electronic device of various embodiments. The electronic device 101 may be denoted as a master device or a central device, and the external devices 103 and 105 may be each denoted as a slave device and/or a peripheral device.

Referring to FIG. 1, the electronic device 101 of various embodiments may connect (110) with a first external device 103 through short-range wireless communication, and may receive (112) group device (e.g., pair device) information of the first external device 103. The short-range wireless communication may, for example, include Bluetooth™, Bluetooth low energy (BLE), wireless Internet platform for interoperability (WIPI), WiFi direct, or near field communication (NFC). But, the present disclosure is not limited to this, and may be identically applied to other short-range wireless communications. According to an embodiment, the electronic device 101 may perform a scan operation for searching a peripheral device, based on a user input. By receiving an advertising signal (or packet) of the first external device 103 through the scan, the electronic device 101 may search the first external device 103. The electronic device 101 may perform (110) a short-range wireless communication connection with the first external device 103, based on a user input of requesting a connection with the first external device 103. According to an embodiment, the electronic device 101 may receive (112) information of a group device of the first external device 103 from the first external device 103 connected through the short-range wireless communication. The information of the group device may include media access control (MAC) address information of at least one another external device grouped with the first external device 130. The at least one another external device grouped with the first external device 130 may include at least one another external device whose connection and communication with the electronic device 101 are possible at a time point when the first external device 130 is connected to the electronic device 101. According to an embodiment, the first external device 130 may perform direct communication and/or indirect communication (e.g., communication through the electronic device 101) with at least one another external device grouped with the first external device 103.

According to various embodiments, the first external device 103 may perform (110) the short-range wireless communication connection with the electronic device 101. According to an embodiment, the first external device 103 may transmit an advertising signal (or packet) indicating the existence of the first external device 103, based on a user input, thereby performing the short-range wireless communication connection with the electronic device 101. According to an embodiment, the first external device 103 may transmit (112) information of a previously configured group device of the first external device 103 to the electronic device 101 connected through the short-range wireless communication. For example, the first external device 103 may transmit address information of the second external device 105 previously configured as a group device of the first external device 103, to the electronic device 101. The address information may, for example, include a media access control (MAC) address. The first external device 103 may obtain the address information of the second external device 105 configured as the group device of the first external device 103, from a memory of the first external device 103.

According to various embodiments, in response to the first external device 103 being connected, the electronic device 101 may connect (120) with the second external device 105, based on group device information received from the first external device 103. According to an embodiment, in response to the group device information being obtained from the first external device 103, the electronic device 101 may identify that the first external device 103 is a device used in a group, and may connect with the second external device 105 that is a group device of the first external device 103. For example, the electronic device 101 may perform a short-range wireless communication connection with the second external device 105, based on address information of the group device obtained from the first external device 103. According to an embodiment, the electronic device 101 may store and register information of the first external device 103 and information of the second external device 105, as information of a connectable device.

According to various embodiments, the second external device 105 may perform (120) the short-range wireless communication connection with the electronic device 101. According to an embodiment, the second external device 105 may transmit an advertising signal (or packet) indicating the existence of the second external device 105, based on a user input, thereby performing the short-range wireless communication connection with the electronic device 101.

The above-mentioned description has been made for a scheme in which an external device (e.g., the first external device 103) connects with the electronic device 101 through short-range wireless communication and thereafter, transmits information of a group device of the external device to the electronic device 101. However, the present disclosure is not limited to this. For example, according to various embodiments of the present disclosure, the external device (e.g., the first external device 103) may transmit the information of the group device of the external device to the electronic device 101 through a signal (e.g., an advertising packet and/or a response signal) transmitted to the electronic device 101 for the sake of a short-range wireless communication connection.

The above-mentioned description has been made for a case in which the electronic device 101 connects with two external devices (e.g., the first external device 103 and the second external device 105), but the present disclosure is not limited to this. For example, various embodiments of the present disclosure may be applied in the same scheme even in response to the electronic device 101 connecting with three or more external devices associated with one another. For instance, the electronic device 101 may obtain information about at least two other external devices that are group devices of one external device connected to the electronic device 101, from the corresponding external device, and automatically connect with the at least two other external devices, based on the obtained information.

Figure 2A:
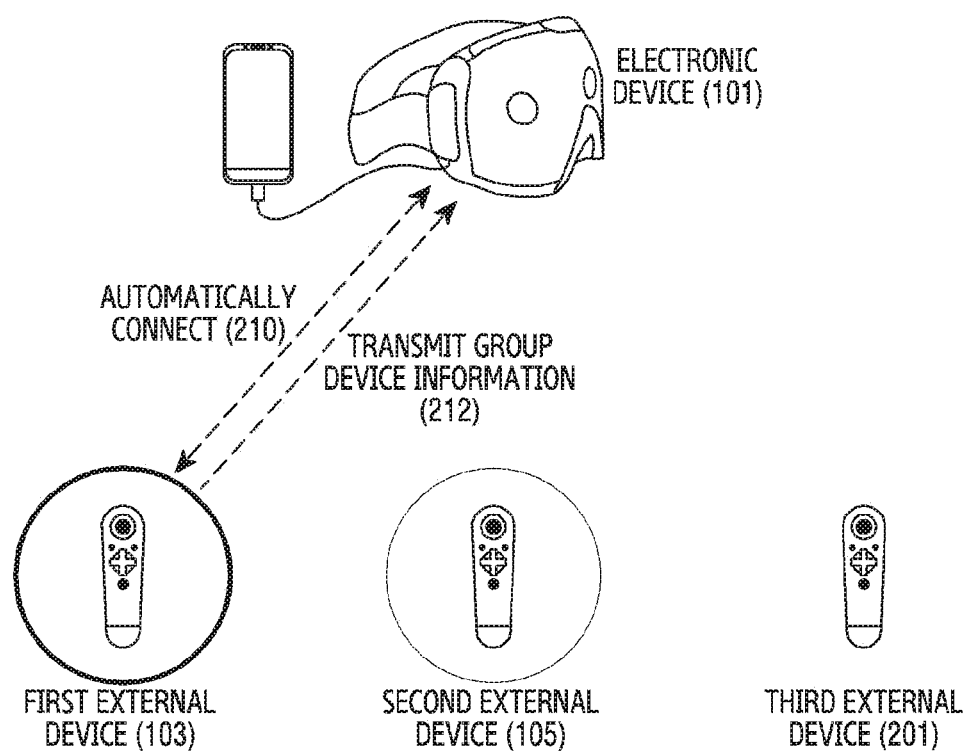
FIGS. 2A-2C illustrate a scheme of configuring a new external device as a group device in an electronic device of various embodiments.
Figure 2B:
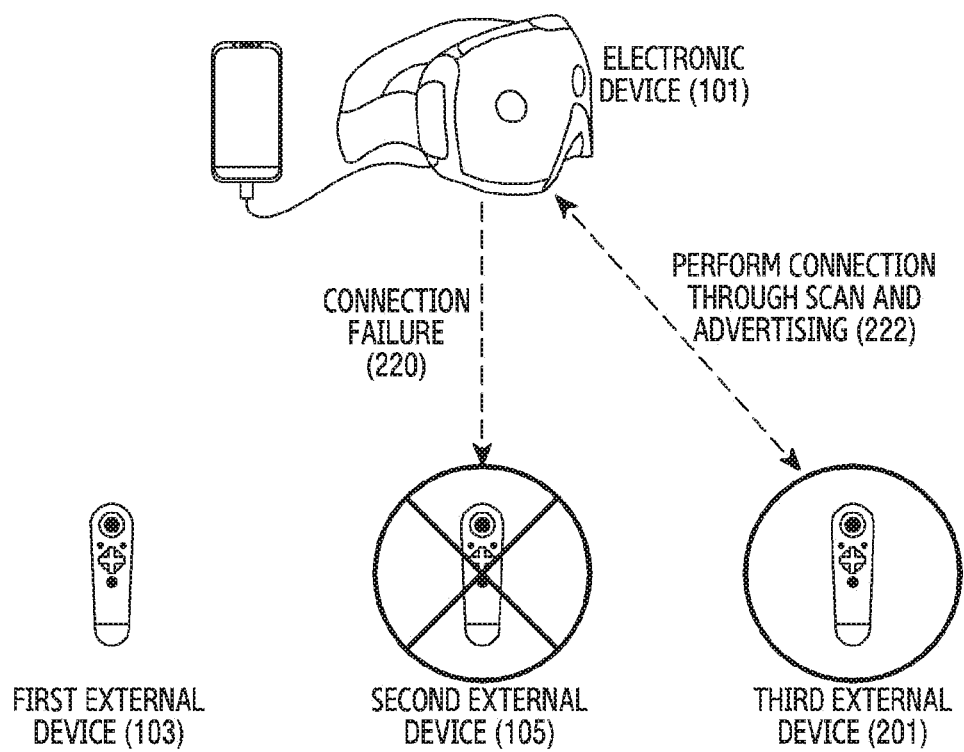
Figure 2C:
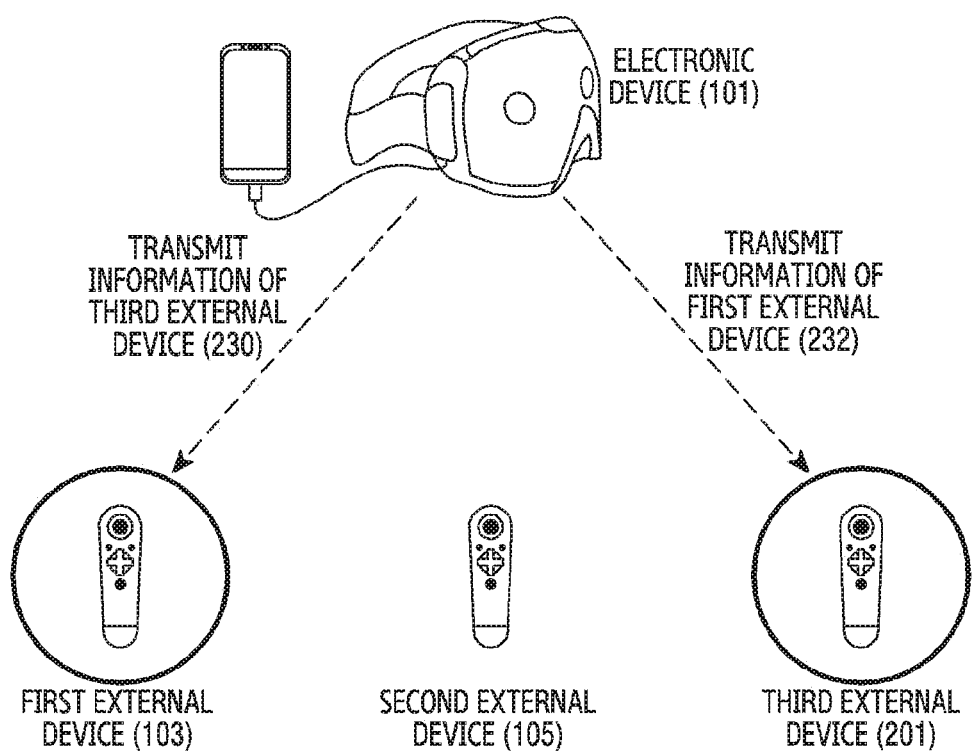

FIGS. 2A-2C illustrate a scheme of configuring a new external device as a group device in an electronic device of various embodiments. Herein, a description is made on the assumption that the first external device 103 and the second external device 105 are previously registered to the electronic device, as connectable devices.

Referring to FIG. 2A, the electronic device 101 of various embodiments may sense the occurrence of a short-range wireless communication connection event, and automatically perform a short-range wireless communication connection 210 with the first external device 103, based on information of the previously registered connectable devices. According to an embodiment, the first external device 103 may transmit (212) group device information of the first external device 103 to the electronic device 101 connected through short-range wireless communication.

Referring to FIG. 2B, in response to being connected with the first external device 103, the electronic device 101 of various embodiments may attempt a short-range wireless communication connection with the second external device 105, based on the group device information of the first external device 103. For example, the electronic device 101 may identify that the first external device 103 is a device used in a group, based on the previously registered information and/or the group device information received from the first external device 103. And, the electronic device 101 may attempt the short-range wireless communication connection with the second external device 105 that is a group device of the first external device 103. In response to an advertising signal (or packet) not being received from the second external device 105 within a given time from a time point when the first external device 103 is connected, the electronic device 101 may identify that the connection with the second external device 105 fails (220).

According to various embodiments, to search a new external device that will be configured as a group device of the first external device 103, the electronic device 101 may perform a scan operation. According to an embodiment, the electronic device 101 may receive an advertising signal (or packet) of a third external device 201 through scan, thereby searching the third external device 201. According to an embodiment, the electronic device 101 may identify the third external device 201 as the group device of the first external device 103, based on a user input and/or equipment information of the third external device 201, and may perform (222) a short-range wireless communication connection with the third external device 201. The equipment information of the third external device 201 may, for example, include at least one of a model name of the third external device 201, an equipment name, manufacturing company information, or a universally unique identifier (UUID).

Referring to FIG. 2C, in response to the first external device 103 and the third external device 201 being connected to the electronic device 101, the electronic device 101 of various embodiments may refine (or update) group device information of the first external device 103 and group device information of the third external device 201. According to an embodiment, the electronic device 101 may transmit (230) information (e.g., address information) of the third external device 201 to the first external device 103, and may transmit (232) information (e.g., address information) of the first external device 103 to the third external device 201. According to an embodiment, the electronic device 101 may recognize that a group device of the first external device 103 changes from the second external device 105 to the third external device 201, and may store information indicating that the first external device 103 and the third external device 201 are devices used in a group. For example, the electronic device 101 may delete information of the second external device 105 stored as group device information of the first external device 103, and may store information of the third external device 201 as the group device information of the first external device 103. According to an embodiment, the electronic device 101 may recognize that the third external device 201 is additionally registered as a group device of the first external device 103, and may store the information indicating that the first external device 103 and the third external device 201 are devices used in a group. For example, the electronic device 101 may maintain the information of the second external device 105 stored as the group device information of the first external device 103, and may additionally store the information of the third external device 201 as the group device information of the first external device 103.

According to various embodiments, the first external device 103 may refine group device information of the first external device 103, based on information of the third external device 201 received from the electronic device 101. According to an embodiment, the first external device 103 may delete address information of a group device previously stored in a memory of the first external device 103, and may store address information of the third external device 201 received from the electronic device 101, as the address information of the group device of the first external device 103. According to an embodiment, the first external device 103 may maintain the address information of the group device previously stored in the memory of the first external device 103, and may additionally store the address information of the third external device 201 received from the electronic device 101, as the address information of the group device of the first external device 103. For example, the first external device 103 may store the address information of the second external device 105 and the address information of the third external device 201, as the information of the group device of the first external device 103.

According to various embodiments, the third external device 201 may refine group device information of the third external device 201, based on information of the first external device 103 received from the electronic device 101. According to an embodiment, the third external device 201 may delete address information of a group device previously stored in a memory of the third external device 201, and may store address information of the first external device 103 received from the electronic device 101, as the address information of the group device of the third external device 201.

Figure 3:
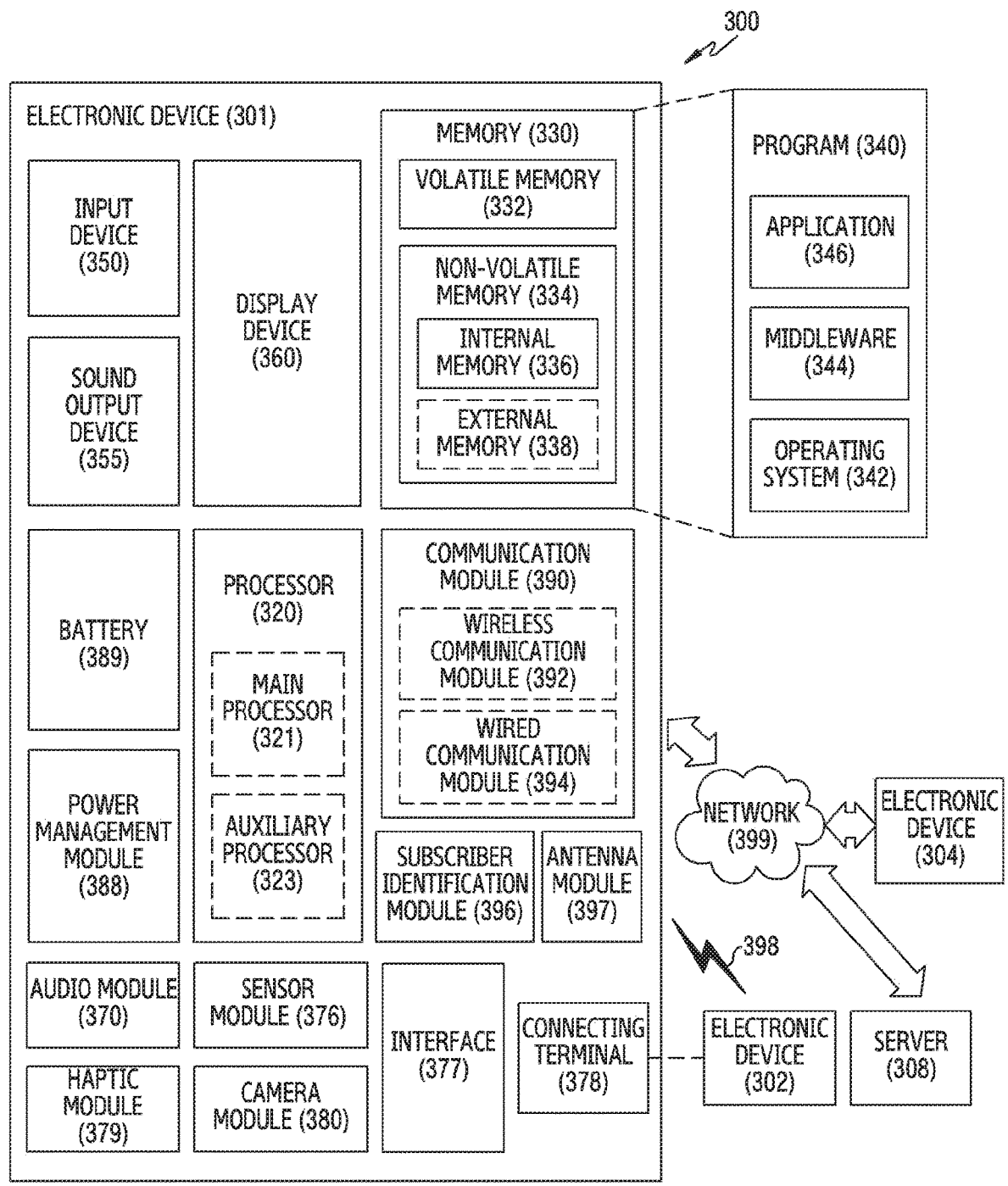
FIG. 3 illustrates a block diagram of an electronic device 301 connecting with external devices within a network environment 300, for connecting with external devices, based on connection information of various embodiments.

FIG. 3 illustrates a block diagram of an electronic device 301 for connecting with external devices within a network environment 300, based on connection information (e.g., group device information), of various embodiments. The electronic device 301 of FIG. 3 may be the electronic device 101 of FIG. 1 and FIG. 2. An electronic device 302 of FIG. 3 may be the first external device 103 of FIG. 1, the second external device 105 of FIG. 1, or the third external device 201 of FIG. 2.

FIG. 3 is a block diagram illustrating an electronic device 301 in a network environment 300 according to various embodiments. Referring to FIG. 3, the electronic device 301 in the network environment 300 may communicate with an electronic device 302 via a first network 398 (e.g., a short-range wireless communication network), or an electronic device 304 or a server 308 via a second network 399 (e.g., a long-range wireless communication network). According to an embodiment, the electronic device 301 may communicate with the electronic device 304 via the server 308. According to an embodiment, the electronic device 301 may include a processor 320, memory 330, an input device 350, a sound output device 355, a display device 360, an audio module 370, a sensor module 376, an interface 377, a haptic module 379, a camera module 380, a power management module 388, a battery 389, a communication module 390, a subscriber identification module (SIM) 396, or an antenna module 397. In some embodiments, at least one (e.g., the display device 360 or the camera module 380) of the components may be omitted from the electronic device 301, or one or more other components may be added in the electronic device 301. In some embodiments, some of the components may be implemented as single integrated circuitry. For example, the sensor module 376 (e.g., a fingerprint sensor, an iris sensor, or an illuminance sensor) may be implemented as embedded in the display device 360 (e.g., a display).

The processor 320 may execute, for example, software (e.g., a program 340) to control at least one other component (e.g., a hardware or software component) of the electronic device 301 coupled with the processor 320, and may perform various data processing or computation. According to one embodiment, as at least part of the data processing or computation, the processor 320 may load a command or data received from another component (e.g., the sensor module 376 or the communication module 390) in volatile memory 332, process the command or the data stored in the volatile memory 332, and store resulting data in non-volatile memory 334. According to an embodiment, the processor 320 may include a main processor 321 (e.g., a central processing unit (CPU) or an application processor (AP)), and an auxiliary processor 323 (e.g., a graphics processing unit (GPU), an image signal processor (ISP), a sensor hub processor, or a communication processor (CP)) that is operable independently from, or in conjunction with, the main processor 321. Additionally or alternatively, the auxiliary processor 323 may be adapted to consume less power than the main processor 321, or to be specific to a specified function. The auxiliary processor 323 may be implemented as separate from, or as part of the main processor 321.

The auxiliary processor 323 may control at least some of functions or states related to at least one component (e.g., the display device 360, the sensor module 376, or the communication module 390) among the components of the electronic device 301, instead of the main processor 321 while the main processor 321 is in an inactive (e.g., sleep) state, or together with the main processor 321 while the main processor 321 is in an active state (e.g., executing an application). According to an embodiment, the auxiliary processor 323 (e.g., an image signal processor or a communication processor) may be implemented as part of another component (e.g., the camera module 380 or the communication module 390) functionally related to the auxiliary processor 323.

The memory 330 may store various data used by at least one component (e.g., the processor 320 or the sensor module 376) of the electronic device 301. The various data may include, for example, software (e.g., the program 340) and input data or output data for a command related thereto. The memory 330 may include the volatile memory 332 or the non-volatile memory 334.

The program 340 may be stored in the memory 330 as software, and may include, for example, an operating system (OS) 342, middleware 344, or an application 346.

The input device 350 may receive a command or data to be used by other component (e.g., the processor 320) of the electronic device 301, from the outside (e.g., a user) of the electronic device 301. The input device 350 may include, for example, a microphone, a mouse, a keyboard, or a digital pen (e.g., a stylus pen).

The sound output device 355 may output sound signals to the outside of the electronic device 301. The sound output device 355 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 360 may visually provide information to the outside (e.g., a user) of the electronic device 301. The display device 360 may include, for example, a display, a hologram device, or a projector and control circuitry to control a corresponding one of the display, hologram device, and projector. According to an embodiment, the display device 360 may include touch circuitry adapted to detect a touch, or sensor circuitry (e.g., a pressure sensor) adapted to measure the intensity of force incurred by the touch.

The audio module 370 may convert a sound into an electrical signal and vice versa. According to an embodiment, the audio module 370 may obtain the sound via the input device 350, or output the sound via the sound output device 355 or a headphone of an external electronic device (e.g., an electronic device 302) directly (e.g., wiredly) or wirelessly coupled with the electronic device 301.

The sensor module 376 may detect an operational state (e.g., power or temperature) of the electronic device 301 or an environmental state (e.g., a state of a user) external to the electronic device 301, and then generate an electrical signal or data value corresponding to the detected state. According to an embodiment, the sensor module 376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 377 may support one or more specified protocols to be used for the electronic device 301 to be coupled with the external electronic device (e.g., the electronic device 302) directly (e.g., wiredly) or wirelessly. According to an embodiment, the interface 377 may include, for example, a high definition multimedia interface (HDMI), a universal serial bus (USB) interface, a secure digital (SD) card interface, or an audio interface.

A connecting terminal 378 may include a connector via which the electronic device 301 may be physically connected with the external electronic device (e.g., the electronic device 302). According to an embodiment, the connecting terminal 378 may include, for example, a HDMI connector, a USB connector, a SD card connector, or an audio connector (e.g., a headphone connector).

The haptic module 379 may convert an electrical signal into a mechanical stimulus (e.g., a vibration or a movement) or electrical stimulus which may be recognized by a user via his tactile sensation or kinesthetic sensation. According to an embodiment, the haptic module 379 may include, for example, a motor, a piezoelectric element, or an electric stimulator.

The camera module 380 may capture a still image or moving images. According to an embodiment, the camera module 380 may include one or more lenses, image sensors, image signal processors, or flashes.

The power management module 388 may manage power supplied to the electronic device 301. According to one embodiment, the power management module 388 may be implemented as at least part of, for example, a power management integrated circuit (PMIC).

The battery 389 may supply power to at least one component of the electronic device 301. According to an embodiment, the battery 389 may include, for example, a primary cell which is not rechargeable, a secondary cell which is rechargeable, or a fuel cell.

The communication module 390 may support establishing a direct (e.g., wired) communication channel or a wireless communication channel between the electronic device 301 and the external electronic device (e.g., the electronic device 302, the electronic device 304, or the server 308) and performing communication via the established communication channel. The communication module 390 may include one or more communication processors that are operable independently from the processor 320 (e.g., the application processor (AP)) and supports a direct (e.g., wired) communication or a wireless communication. According to an embodiment, the communication module 390 may include a wireless communication module 392 (e.g., a cellular communication module, a short-range wireless communication module, or a global navigation satellite system (GNSS) communication module) or a wired communication module 394 (e.g., a local area network (LAN) communication module or a power line communication (PLC) module). A corresponding one of these communication modules may communicate with the external electronic device via the first network 398 (e.g., a short-range communication network, such as Bluetooth™, wireless-fidelity (Wi-Fi) direct, or infrared data association (IrDA)) or the second network 399 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 392 may identify and authenticate the electronic device 301 in a communication network, such as the first network 398 or the second network 399, using subscriber information (e.g., international mobile subscriber identity (IMSI)) stored in the subscriber identification module 396.

The antenna module 397 may transmit or receive a signal or power to or from the outside (e.g., the external electronic device) of the electronic device 301. According to an embodiment, the antenna module 397 may include an antenna including a radiating element composed of a conductive material or a conductive pattern formed in or on a substrate (e.g., PCB). According to an embodiment, the antenna module 397 may include a plurality of antennas. In such a case, at least one antenna appropriate for a communication scheme used in the communication network, such as the first network 398 or the second network 399, may be selected, for example, by the communication module 390 (e.g., the wireless communication module 392) from the plurality of antennas. The signal or the power may then be transmitted or received between the communication module 390 and the external electronic device via the selected at least one antenna. According to an embodiment, another component (e.g., a radio frequency integrated circuit (RFIC)) other than the radiating element may be additionally formed as part of the antenna module 397.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 301 and the external electronic device 304 via the server 308 coupled with the second network 399. Each of the electronic devices 302 and 304 may be a device of a same type as, or a different type, from the electronic device 301. According to an embodiment, all or some of operations to be executed at the electronic device 301 may be executed at one or more of the external electronic devices 302, 304, or 308. For example, if the electronic device 301 should perform a function or a service automatically, or in response to a request from a user or another device, the electronic device 301, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 301. The electronic device 301 may provide the outcome, with or without further processing of the outcome, as at least part of a reply to the request. To that end, a cloud computing, distributed computing, or client-server computing technology may be used, for example.

According to various embodiments, the processor 320 may control the communication module 390 to connect with at least one external device (e.g., the electronic device 302, the first external device 103, the second external device 105 or the third external device 201) through short-range wireless communication. According to an embodiment, the processor 320 may perform a scan operation for searching at least one external device through a short-range communication module included in the communication module 390, thereby receiving a signal (e.g., advertising signal) indicating that it is in a state of being connectable through the short-range wireless communication, from the at least one external device. For example, the processor 320 may sense an event for connection with an external device, based on a user input through the input device 350, and in response to this, may control the short-range wireless communication module to perform a scan operation. The processor 320 may search the first external device 103 through the short-range communication module, and may display, on the display device 360, a user interface of requesting to select connection or non-connection to the searched first external device 103. The user interface of requesting to select the connection or non-connection to the first external device 103 may include equipment information of the first external device 103. The equipment information may, for example, include at least one of a model name, an equipment name, manufacturing company information, or a universally unique identifier (UUID). The processor 320 may obtain equipment information of the first external device 103 from a signal received from the first external device 103. According to an embodiment, the processor 320 may perform a short-range wireless communication connection with the first external device 103, based on a user input through the input device 350. According to an embodiment, the processor 320 may connect short-range wireless communication with the first external device 103, without a user input in accordance with a short-range wireless communication connection scheme.

According to various embodiments, the processor 320 may identify whether the first external device 103 connected to the electronic device 301 through short-range wireless communication is a device used in a group (e.g., pair) with another external device. According to an embodiment, the processor 320 may identify whether the first external device 103 is a device used in a group with another external device, based on whether group device information (e.g., pair device information) of the connected first external device 103 is received from the connected first external device 103. The group device information of the first external device 103 may include address information (e.g., MAC address) of at least one another external device grouped with the first external device 103. In response to the group device information of the first external device 103 being received from the first external device 103, the processor 320 may identify that the first external device 103 is a device used in a group with the second external device 105 corresponding to the group device information of the first external device 103. The group device information of the first external device 103 may be obtained from a signal received for the sake of a short-range wireless communication connection, or may be obtained from a signal received after the short-range wireless communication connection. For example, the group device information of the first external device 103 may be obtained from an advertising signal received from the first external device 103. In another example, the group device information of the first external device 103 may be obtained from a signal received after the first external device 103 is connected to the electronic device 301 through short-range wireless communication.

According to various embodiments, in response to the first external device 103 being the device used in a group, the processor 320 may connect with the second external device 105 through short-range wireless communication, based on group device information of the first external device 103. According to an embodiment, in response to the group device information of the first external device 103 being received from the first external device 103, the processor 320 may connect with the second external device 105 being a group device of the first external device 103, through the short-range wireless communication, based on the received group device information of the first external device 103. For example, the processor 320 may perform a scan operation, to receive an advertising signal from the second external device 105. The processor 320 may identify whether the second external device 105 is a group device of the first external device 103, on the basis of whether address information included in an advertising signal of the second external device 105 and address information of the group device received from the first external device 103 are identical with each other. In response to the address information included in the received advertising signal being identical with the address information of the group device received from the first external device 103, the processor 320 may identify the second external device 105 as a group device of the first external device 103, and may connect with the second external device 105 through the short-range wireless communication. According to an embodiment, the processor 320 may receive group device information of the second external device 105 from the second external device 105, and may compare whether the received group device information of the second external device 105 and information of the first external device 103 are consistent with each other, to thereby check whether the first external device 103 and the second external device 105 are devices used in a group.

According to various embodiments, in response to the first external device 103 and the second external device 105 which are used in a group being connected with the electronic device 101 through short-range wireless communication, the processor 320 may store and register, in the memory 330, information indicating that the first external device 103 and the second external device 105 are group devices connectable with the electronic device 101. According to an embodiment, the processor 320 may associate information of the first external device 103 and information of the second external device 105, and store the associated result in the memory 330. For example, the processor 320 may associate the information of the first external device 103, group device information of the first external device 103, the information of the second external device 105, and group device information of the second external device 105, and store the associated result in the memory 330.

According to various embodiments, the processor 320 may sense that an event of requesting a connection with an external device occurs through the input device 350, and may automatically perform a short-range wireless communication connection with the first external device 103, based on information of a previously registered connectable group device. For example, the processor 320 may perform a scan operation through the short-range wireless communication module, to search the first external device 103 corresponding to the information of the previously registered connectable group device, and may automatically connect with the searched first external device 103.

According to various embodiments, in response to the first external device 103 used in a group with at least one another external device being connected, the processor 320 may attempt an automatic connection with the second external device 105 that is a group device of the first external device 103. For example, the processor 320 may identify that the first external device 103 is a device used in a group, based on previously registered information and/or group device information received from the first external device 103, and may attempt a short-range wireless communication connection with the second external device 105 being a group device of the first external device 103. According to an embodiment, the processor 320 may perform a connection with the second external device 105 being a group device of the first external device 103, based on whether an advertising signal (or packet) including information about the group device of the first external device 103 is received within a given time from a time point when the first external device 103 is connected, or may sense a failure of a connection with the second external device 105. For example, in response to the advertising signal including the information about the group device of the first external device 103 being received within the given time from the time point when the first external device 103 is connected, the processor 320 may perform a connection with the second external device 105 having transmitted the advertising signal. In another example, in response to the advertising signal including the information about the group device of the first external device 103 not being received within the given time from the time point when the first external device 103 is connected, the processor 320 may identify that the connection with the second external device 105 has failed. According to various embodiments, in response to the failure of connection with the second external device 105 that is the group device of the first external device 103 being sensed in a state in which the first external device 103 is connected, the processor 320 may show the failure of connection with the second external device 105, while providing a user interface of inquiring whether to register a new external device as the group device of the first external device 103. According to an embodiment, the processor 320 may search and connect with the new external device, based on a user input of requesting a registration of the new external device. According to an embodiment, the processor 320 may receive an advertising signal (or packet) of the third external device 201 through scan, thereby searching the third external device 201 that is the new external device. According to an embodiment, the processor 320 may identify whether to use (or register) the third external device 201 as a group device of the first external device 103, based on equipment information of the searched third external device 201 and/or a user input. For example, the processor 320 may provide a user interface of inquiring whether to use the searched third external device 201 as the group device of the first external device 103, and may perform a short-range wireless communication connection with the third external device 201, based on a user input indicating that the third external device 201 is used as the group device of the first external device 103. The user interface of inquiring whether to use the searched third external device 201 as the group device of the first external device 103 may include equipment information of the third external device 201. The equipment information of the third external device 201 may be obtained from an advertising signal of the third external device 201. In another example, the processor 320 may identify whether to use the third external device 201 as the group device of the first external device 103, based on the equipment information of the searched third external device 201 and equipment information of the first external device 103 connected to the electronic device 101. For instance, in response to the equipment information of the searched third external device 201 and the equipment information of the first external device 103 being consistent with each other, the processor 320 may identify to use the third external device 201 as the group device of the first external device 103, and may perform a short-range wireless communication connection with the third external device 201. According to an embodiment, the processor 320 may register the third external device 201 being the new external device as the group device of the first external device 103. For example, the processor 320 may delete information of the second external device 105 previously registered as group device information of the first external device 103, and may register information of the third external device 201 as the group device information of the first external device 103. In another example, the processor 320 may register the previously registered information of the second external device 105 and the information of the third external device 201 being the new external device, as the group device information of the first external device 103.

According to various embodiments, in response to the third external device 201 that is a new external device being registered as a group device of the first external device 103, the processor 320 may refine group device information of the first external device 103 and group device information of the third external device 201. According to an embodiment, the processor 320 may transmit information (e.g., address information) of the third external device 201 to the first external device 103 through the communication module 290, and transmit information (e.g., address information) of the first external device 103 to the third external device 201.

Figure 4:
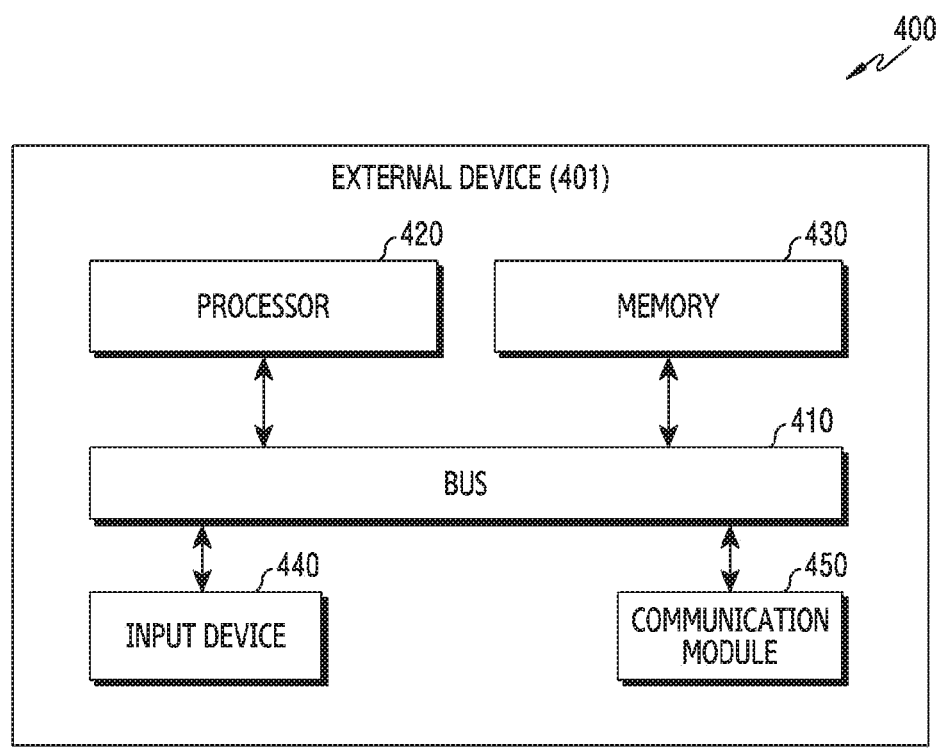
FIG. 4 illustrates a block diagram of an external device 401 of various embodiments.

FIG. 4 illustrates a block diagram 400 of an external device 401 of various embodiments. The external device 402 of FIG. 4 may be the first external device 103, the second external device 105, or the third external device 201 illustrated in FIG. 1 and/or FIG. 2.

Referring to FIG. 4, the external device 401 may include a bus 410, a processor 420, a memory 430, an input device 440, and a communication module 450. In some embodiment, the external device 401 may omit at least one of the components or may additionally have another component.

According to various embodiments, the bus 410 may, for example, include a circuit connecting the components 420 to 450 with one another, and forwarding a communication (e.g., a control message and/or data) between the components.

According to various embodiments, the processor 420 may run, for example, software (e.g., a program), to control at least one another component (e.g., a hardware or software component) connected to the processor 420, and may perform various data processing and operations.

According to various embodiments, the processor 420 may sense a short-range wireless communication connection event through the input device 440, and may control the communication module 450 to perform a short-range wireless communication connection with an electronic device (e.g., the electronic device 301). According to an embodiment, in response to the short-range wireless communication connection event being sensed through the input device 440, the processor 420 may control a short-range wireless communication module of the communication module 450, to transmit a signal (e.g., an advertising signal) indicating that it is in a state of being connectable through short-range wireless communication. For example, the processor 420 may transmit a signal that includes at least one of equipment information of the external device 401, address information of the external device 401, or group device information of the external device 401. According to an embodiment, after being connected with the electronic device (e.g., the electronic device 301) through the short-range wireless communication, the processor 420 may obtain the group device information of the external device 401 from the memory 430, and transmit a signal including the obtained group device information of the external device 401. The group device information of the external device 401 may include address information of at least one another external device that is used together with the external device 401. According to an embodiment, the group device information of the external device 401 may be transmitted through a short-range wireless communication connection between the external device 401 and the electronic device 301, or may be transmitted in another communication scheme. According to an embodiment, each of address information of another external device included in the group device information of the external device 401 may be associated with time information and/or location information and be stored. The time information associated with the address information of the another external device may include at least one of information indicating a time point when the address information of the another external device is registered to the electronic device 101, information indicating a time point when the address information of the another external device is registered to the first external device 103, or time information configured by a user. The location information associated with the address information of the another external device may include at least one of information indicating a location (e.g., a location of the electronic device 101) of a time point when the address information of the another external device is registered to the electronic device 101, information indicating a location (e.g., a location of the first external device 103) of a time point when the address information of the another external device is registered to the first external device 103, or location information configured by the user. The time information and/or location information associated with the address information of the another external device may be received from the electronic device 301, or may be inputted through the input device 440 of the external device 401. According to an embodiment, the processor 420 may select address information of at least one another external device among address information of a plurality of other external devices, based on the time information and/or location information, and may transmit a signal which includes the selected address information of the at least one another external device as at least part of the group device information of the external device 401. For example, the processor 420 may select the address information of the at least one anther external device among the address information of the plurality of other external devices, based on a time point connected with the electronic device 301 through the short-range wireless communication and/or a location connected through the short-range wireless communication. For instance, in response to a time point when the short-range wireless communication connection event is sensed being 10 o'clock A.M., the processor 420 may select address information of another external device having time information nearest to 10 o'clock A.M. among other external devices registered as group devices of the external device 401. In another example, in response to a location where the short-range wireless communication connection event is sensed being a point A, the processor 420 may select address information of another external device having location information closest to the point A among the other external devices registered as the group devices of the external device 401. This is an example, and various embodiments of the present disclosure are not limited to this. For example, the processor 420 may select the address information of the at least one another external device in various schemes that are based on the time and/or location information. According to various embodiments, the processor 420 may receive group device information of the external device from the electronic device connected through the short-range wireless communication, and may refine group device information of the external device 401, based on the received group device information of the external device. For example, the processor 420 may delete the group device information stored in the memory 430, and may store the group device information of the external device received from the electronic device, as the group device information of the external device 401. In another example, the processor 420 may maintain the group device information stored in the memory 430, and may additionally store the group device information of the external device received from the electronic device.

According to various embodiments, the memory 430 may store group device information of the external device 401. The group device information of the external device 401 may include address information of at least one another external device that is used in a group with the external device 401. According to an embodiment, the group device information of the external device 401 may be configured at design, and may be refined according to the control of the processor 420.

According to various embodiments, the input device 440 is a device for receiving a command or data, which will be used for a component (e.g., the processor 420) of the external device 401, from outside (e.g., a user) the external device 401, and may include, for example, a microphone, a key button, a keypad, a touch sensor, or a pressure sensor. According to an embodiment, the input device 440 may receive a user input of requesting a short-range wireless communication connection.

According to various embodiments, the communication module 450 may support the establishment of a wired or wireless communication channel between the external device 401 and an electronic device (e.g., the electronic device 301), and communication execution through the established communication channel. The communication module 450 may include one or more communication processors that are operated independently of the processor 420 (e.g., an application processor (AP)) and support a wired communication or a wireless communication. According to an embodiment, the communication module 450 may include a short-range wireless communication module, and may communicate with the electronic device through the short-range wireless communication module.

According to various embodiments, an electronic device may include a communication interface, and at least one processor. The processor may be configured to attempt a connection with a second external device through the communication interface, based at least on group device information of a first external device connected to the electronic device, and connect with a third external device through the communication interface, based at least on a failure of connection with the second external device, and refine the group device information of the first external device, based at least on information of the connected third external device.

According to various embodiments, the processor may be configured to receive address information of the second external device that is a group device of the first external device from the first external device, through the communication interface, and perform a short-range wireless communication connection with the second external device, based on the address information of the second external device received from the first external device.

According to various embodiments, the processor may be configured to refine the group device information of the first external device based on address information of the third external device, and transmit the refined group device information of the first external device to the first external device through the communication interface.

According to various embodiments, the processor may be configured to determine group device information of the third external device based on address information of the first external device, and transmit the determined group device information of the third external device to the third external device through the communication interface.

According to various embodiments, the processor may be configured to search at least one external device through the communication interface, based at least on the failure of connection with the second external device, and select one of the at least one external device as the third external device, based on equipment information of the at least one external device, and perform a short-range wireless communication connection with the selected third external device through the communication interface.

According to various embodiments, the equipment information may include at least one of a model name, an equipment name, manufacturing company information, or a universally unique identifier (UUID).

According to various embodiments, the electronic device may further include a display. The processor may be configured to display, on the display, the equipment information of the at least one external device, and select one of the at least one external device as the third external device, based on a user input for the displayed information.

According to various embodiments, the electronic device may further include a display. The processor may be configured to display a failure of connection to a group device of the first external device on the display, based at least on the failure of connection with the second external device.

According to various embodiments, the processor may be configured to sense an event for registering a new external device as the group device of the first external device on the basis of a user input, based at least on the failure of connection with the second external device, and in response to the event sensing, search the third external device through the communication interface.

According to various embodiments, the processor may be configured to use the third external device as the group device of the first external device.

According to various embodiments, an external device may include a communication interface, a memory for storing instructions, and at least one processor. At execution, the instructions may enable the processor to connect with an electronic device through the communication interface, and receive group device information from the electronic device, through the communication interface, and refine information about a group device of the external device, based on the received group device information.

According to various embodiments, the group device information may include address information about the group device of the external device.

According to various embodiments, at execution, the instructions may enable the processor to perform a short-range wireless communication connection with the electronic device, through the communication interface, and transmit information about the group device of the external device to the connected electronic device.

According to various embodiments, at execution, the instructions may enable the processor to select at least one another external device among a plurality of other external devices registered as the group device of the external device, based at least on time information or location information, and transmit information about the selected at least one another external device to the connected electronic device.

Figure 5:
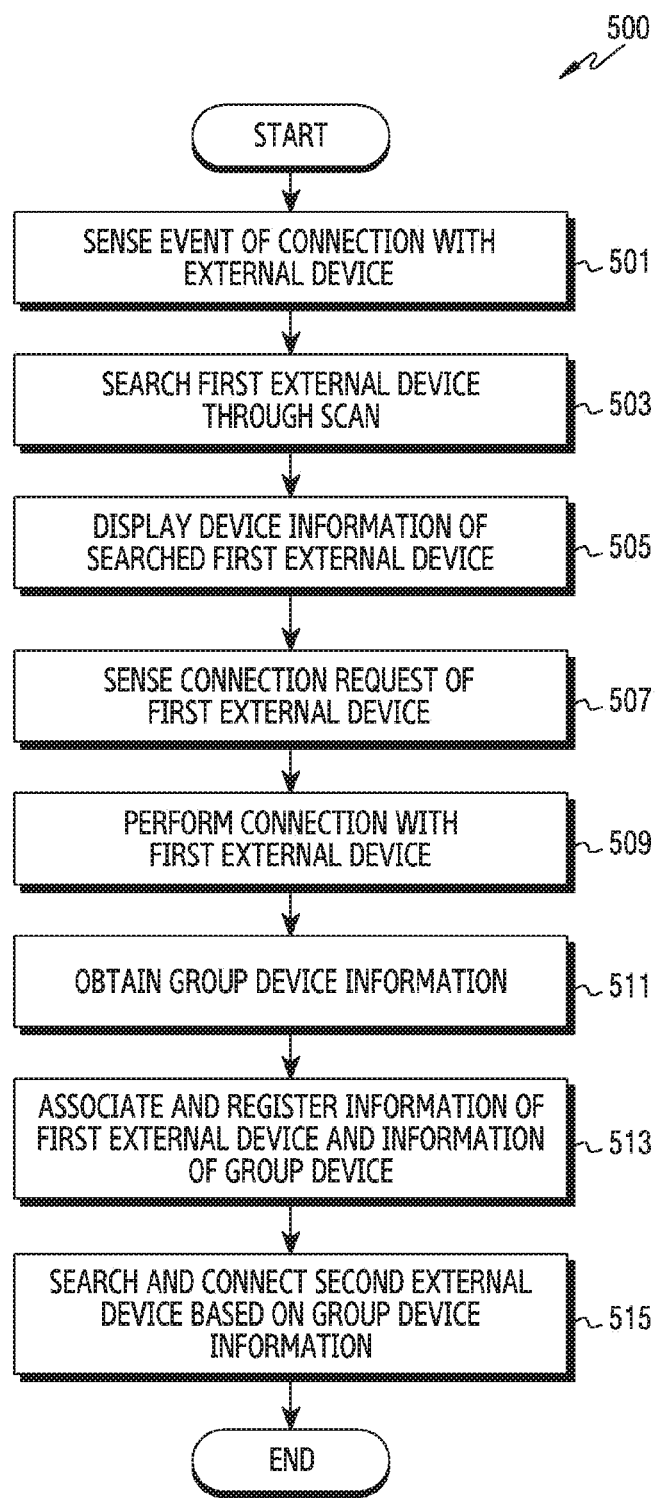
FIG. 5 illustrates a flowchart for registering external devices used in a group in an electronic device of various embodiments.

FIG. 5 illustrates a flowchart 500 for registering external devices used in a group in an electronic device of various embodiments. In an embodiment below, respective operations may be performed in sequence as well, but are not necessarily performed in sequence. For example, the order of respective operations may be changed as well, and at least two operations may be performed in parallel as well. Herein, the electronic device may be the electronic device 101 of FIG. 1, the electronic device 101 of FIG. 2, and/or the electronic device 101 of FIG. 3.

Referring to FIG. 5, in operation 501, the electronic device (e.g., the processor 320) of various embodiments may sense an event for connection with an external device. According to an embodiment, the processor 320 of the electronic device may sense a user input of requesting a connection with the external device through an input device (e.g., the input device 350), and may sense that the event for connection with the external device has occurred, based on the sensed user input. According to an embodiment, in response to there being a request for execution of a service (or application) that uses the connection with the external device, the processor 320 of the electronic device may identify that the event for connection with the external device has occurred.

According to various embodiments, in operation 503, the electronic device (e.g., the processor 320) may search the first external device 103 through scan. According to an embodiment, the processor 320 of the electronic device may activate a short-range wireless communication module to perform scan, and may receive a signal (e.g., advertising signal) from the first external device 103 through the scan, thereby searching the first external device 103.

According to various embodiments, in operation 505, the electronic device (e.g., the processor 320) may display equipment information of the searched first external device 103. According to an embodiment, the processor 320 of the electronic device may obtain the equipment information of the first external device 103 from the signal received from the first external device 103, and may control the display device 360 to display the obtained equipment information. The equipment information may, for example, include at least one of a model name, an equipment name, manufacturing company information, or a universally unique identifier (UUID). According to an embodiment, the processor 320 of the electronic device may display the equipment information of the first external device 103, while providing a user interface of requesting a selection of whether to connect short-range wireless communication with the first external device 103.

According to various embodiments, in operation 507, the electronic device (e.g., the processor 320) may sense a user input of requesting a short-range wireless communication connection to the first external device 103. According to an embodiment, the processor 320 of the electronic device may sense the user input of requesting the short-range wireless communication connection with the first external device 103 through the input device 350.

According to various embodiments, in operation 509, the electronic device (e.g., the processor 320) may perform the short-range wireless communication connection with the first external device 103. According to an embodiment, the processor 320 of the electronic device may perform the short-range wireless communication connection with the first external device 103, based on the user input. For example, the processor 320 of the electronic device may perform the short-range wireless communication connection with the first external device 103 by using any one of Bluetooth™, BLE, WIPI, WiFi direct, or NFC.

According to various embodiments, in operation 511, the electronic device (e.g., the processor 320) may obtain group device information (e.g., pair device information) of the first external device 103. According to an embodiment, in response to being connected with the first external device 103 through the short-range wireless communication, the processor 320 of the electronic device may obtain the group device information of the first external device 103 through the short-range wireless communication. But, a time point of obtaining the group device information of the first external device 103 is not limited to this. For example, the processor 320 of the electronic device may obtain the group device information of the first external device 103 from at least one signal which is transmitted and/or received for the sake of the short-range wireless communication connection. For instance, the processor 320 of the electronic device may obtain the group device information of the first external device 103 from an advertising signal received from the first external device 103.

According to various embodiments, in operation 513, the electronic device (e.g., the processor 320) may associate and register information of the first external device 103 and group device information of the first external device 103. According to an embodiment, in response to the group device information of the first external device 103 being received from the first external device 103, the processor 320 of the electronic device may identify the first external device 103 as a device used in a group with another external device, and associate the information of the first external device 103 and the received group device information of the first external device 103 and store the associated result in the memory 330.

According to various embodiments, in operation 515, the electronic device (e.g., the processor 320) may search and connect with the second external device 105, based on the group device information of the first external device 103. According to an embodiment, the processor 320 of the electronic device may search the second external device 105 that is a group device of the first external device 103, based on the group device information received from the first external device 103, and may perform a short-range wireless communication connection with the searched second external device 105. For example, the processor 320 of the electronic device may search the second external device 105 through a scan operation using the short-range wireless communication module, based on whether an advertising signal including the same address information as address information of a group device received from the first external device 103 is received. In response to the advertising signal including the same address information as the received address information of the group device being received, the processor 320 of the electronic device may identify the second external device 105 corresponding to the corresponding advertising signal, as the group device of the first external device 103, and may connect with the second external device 105 through the short-range wireless communication.

Figure 6:
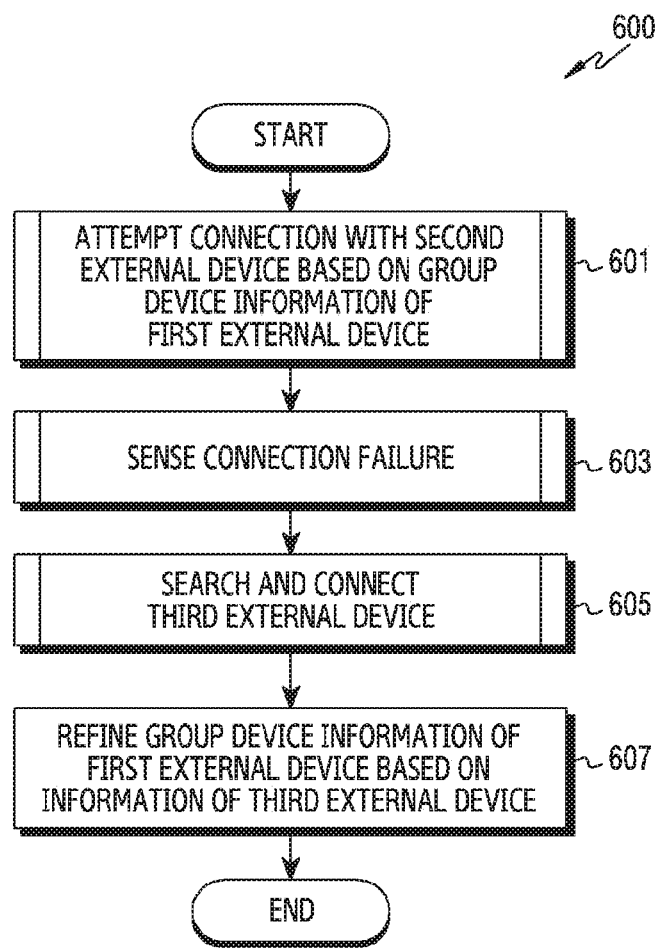
FIG. 6 illustrates a flowchart for configuring a new external device as a group device of a previously connected external device in an electronic device of various embodiments.

FIG. 6 illustrates a flowchart 600 for configuring a new external device as a group device of a previously connected external device in an electronic device of various embodiments. In an embodiment below, respective operations may be performed in sequence as well, but are not necessarily performed in sequence. For example, the order of respective operations may be changed as well, and at least two operations may be performed in parallel as well. Herein, the electronic device may be the electronic device 101 of FIG. 1, the electronic device 101 of FIG. 2, and/or the electronic device 101 of FIG. 3.

Referring to FIG. 6, in operation 601, the electronic device (e.g., the processor 320) of various embodiments may attempt a connection with the second external device 105, based on group device information of the first external device 103. According to an embodiment, in response to the connection with the first external device 103 being sensed, the processor 320 of the electronic device may sense that the first external device 103 is a device used in a group, based on the group device information of the first external device 103. The processor 320 of the electronic device may attempt a short-range wireless communication connection with the second external device 105 having information corresponding to the group device information of the first external device 103, based on the group device information of the first external device 103. For example, the processor 320 of the electronic device may attempt the short-range wireless communication connection with the second external device 105 through scan, based on whether a signal having the same address information as address information of a group device of the first external device 103 is received.

According to various embodiments, in operation 603, the electronic device (e.g., the processor 320) may sense that the connection with the second external device 105 has failed. According to an embodiment, in response to the signal having the same address information as the address information of the group device of the first external device 103 not being received with a given time, the processor 320 of the electronic device may identify that the connection with the second external device 105 has failed. According to an embodiment, the processor 320 of the electronic device may control the display device 360 to display information indicating that the connection with the second external device 105 fails. According to an embodiment, the processor 320 of the electronic device may control the display device 360 to display the information indicating that the connection with the second external device 105 has failed, while displaying a message of inquiring whether to register a new external device as a group device of the first external device 103.

According to various embodiments, in operation 605, the electronic device (e.g., the processor 320) may search and connect with the third external device 201. According to an embodiment, the processor 320 of the electronic device may sense a user input of requesting a registration of a new external device that will be used as a group device of the first external device 103, and may search and connect with the third external device 201. In response to the user input of requesting the registration of the new external device being sensed, the processor 320 of the electronic device may receive an advertising signal (or packet) from the third external device 201 through scan, thereby searching the third external device 201 that is the new external device. The processor 320 of the electronic device may perform a short-range wireless communication connection with the searched third external device 201.

According to various embodiments, in operation 607, the electronic device (e.g., the processor 320) may refine group device information of the first external device 103, based on information of the third external device 201. According to an embodiment, the processor 320 of the electronic device may store and/or register the information of the third external device 201 connected through short-range wireless communication, as the group device information of the first external device 103. According to an embodiment, the processor 320 of the electronic device may transmit the information of the third external device 201 to the first external device 103 through the communication module 390, to request to refine the group device information of the first external device 103. For example, the processor 320 of the electronic device may transmit address information of the third external device 201 to the first external device 103, thereby requesting to change the address information of the group device stored in the memory 430 of the first external device 103 from address information of the second external device 105 to the address information of the third external device 201. In another example, the processor 320 of the electronic device may transmit the address information of the third external device 201 to the first external device 103, thereby requesting to additionally register the address information of the third external device 201 to the address information of the group device of the first external device 103. According to an embodiment, the processor 320 of the electronic device may associate time and/or location information at which the address information of the third external device 201 is registered to the electronic device, with the address information of the third external device 201, and may transmit the associated result to the first external device 103. According to an embodiment, the processor 320 of the electronic device may transmit information of the first external device 103 to the third external device 201 through the communication module 390, to request to refine group device information of the third external device 201. For example, the processor 320 of the electronic device may transmit the address information of the first external device 103 to the third external device 201, thereby requesting to change address information of a group device stored in the memory 430 of the third external device 201 into the address information of the first external device 103. In another example, the processor 320 of the electronic device may transmit the address information of the first external device 103 to the third external device 201, thereby requesting to additionally register the address information of the first external device 103 to the address information of the group device of the third external device 201. According to an embodiment, the processor 320 of the electronic device may associate time and/or location information at which the address information of the first external device 103 has been registered to the electronic device, with the address information of the first external device 103, and transmit the associated result to the third external device 201.

Figure 7:
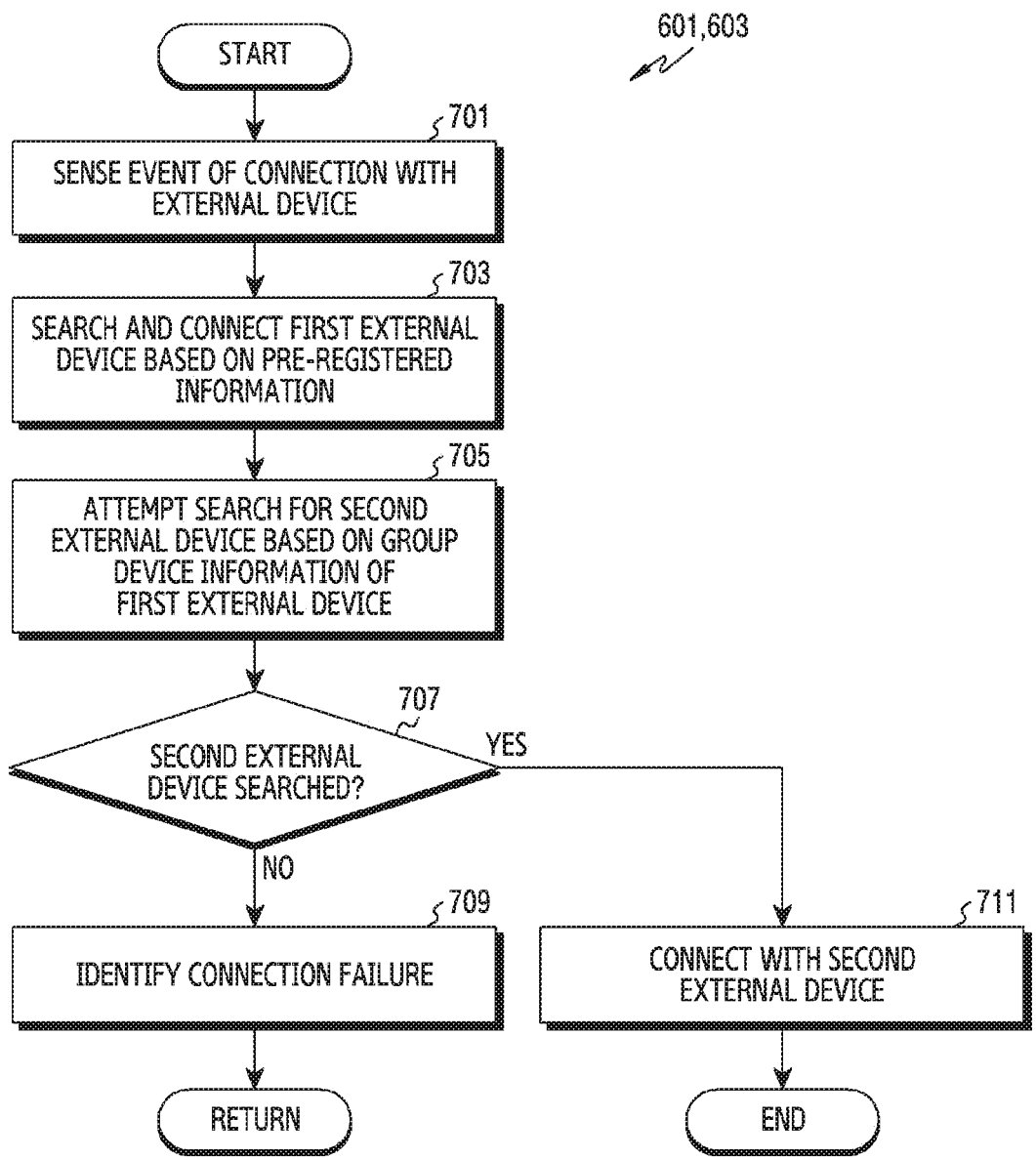
FIG. 7 illustrates a flowchart for automatically connecting with external devices used in a group in an electronic device of various embodiments.

FIG. 7 illustrates a flowchart of operation 601 and/or 603 for automatically connecting with external devices used in a group in an electronic device of various embodiments. Below, an operation of FIG. 7 may be at least part of a detailed operation of operations 601 and 603 of FIG. 6. In an embodiment below, respective operations may be performed in sequence as well, but are not necessarily performed in sequence. For example, the order of respective operations may be changed as well, and at least two operations may be performed in parallel as well. Herein, the electronic device may be the electronic device 101 of FIG. 1, the electronic device 101 of FIG. 2, and/or the electronic device 101 of FIG. 3.

Referring to FIG. 7, in operation 701, the electronic device (e.g., the processor 320) of various embodiments may sense an event for connection with an external device. According to an embodiment, as explained in operation 501 of FIG. 5, the processor 320 of the electronic device may sense the event for connection with the external device.

According to various embodiments, in operation 703, the electronic device (e.g., the processor 320) may search and connect with the first external device 103, based on previously registered information. According to an embodiment, the processor 320 of the electronic device may search the first external device 103, based on information of a connectable group device previously registered to the memory 330, and may perform a short-range wireless communication connection with the searched first external device 103. According to an embodiment, the information of the connectable group device may be previously registered to the memory 330 through operations illustrated in FIG. 5. For example, the processor 320 of the electronic device may perform a scan operation through the short-range wireless communication module, to search the first external device 103 corresponding to the information of the previously registered connectable group device, and may automatically connect with the searched first external device 103.

According to various embodiments, in operation 705, the electronic device (e.g., the processor 320) may attempt a search for the second external device 105, based on group device information of the first external device 103. According to an embodiment, the processor 320 of the electronic device may attempt the search for the second external device 105 that is a group device of the first external device 103, based on the group device information beforehand received and registered from the first external device 103 and/or the group device information received after a short-range wireless communication connection with the first external device 103. For example, the processor 320 of the electronic device may activate the short-range wireless communication module for the sake of the search for the second external device 105, and control to perform a scan operation.

According to various embodiments, in operation 707, the electronic device (e.g., the processor 320) may identify whether the second external device 105 is searched. According to an embodiment, the processor 320 of the electronic device may sense whether a signal including the same address information as address information of a group device of the first external device 103 is received within a given time through scan. In response to the signal having the same address information as the address information of the group device of the first external device 103 being received within the given time, the processor 320 of the electronic device may identify that the second external device 105 has been searched. In response to the signal having the same address information as the address information of the group device of the first external device 103 not being received within the given time, the processor 320 of the electronic device may identify that the second external device 105 has not been searched.

According to various embodiments, in response to the second external device 105 not being searched, in operation 709, the electronic device (e.g., the processor 320) may identify a failure of connection to the second external device 105. According to an embodiment, in response to the signal including the same address information as the address information of the group device of the first external device 103 not being received within the given time, the processor 320 of the electronic device may identify that the connection with the second external device 105 has failed due to the failure of search for the second external device 105.

According to various embodiments, in response to the second external device 105 being searched, in operation 711, the electronic device (e.g., the processor 320) may perform a connection with the second external device 105. According to an embodiment, in response to the signal including the same address information as the address information of the group device of the first external device 103 being received within the given time, the processor 320 of the electronic device may identify that the second external device 105 has been searched, and perform a short-range wireless communication connection with the second external device 105.

Figure 8:
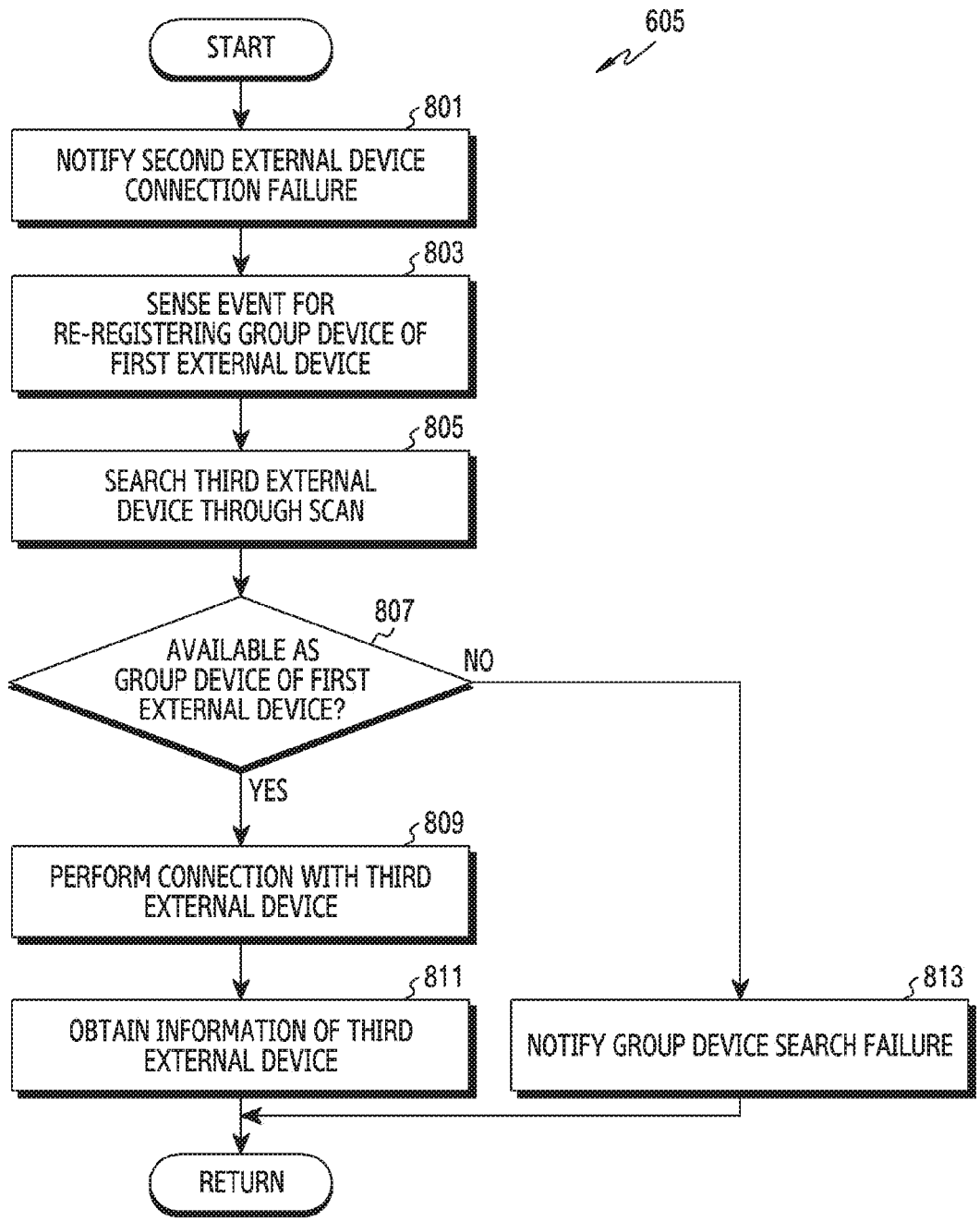
FIG. 8 illustrates a flowchart for connecting with a new external device in an electronic device of various embodiments.

FIG. 8 illustrates a flowchart of operation 605 for connecting with a new external device in an electronic device of various embodiments. Below, an operation of FIG. 8 may be at least part of a detailed operation of operation 605 of FIG. 6. In an embodiment below, respective operations may be performed in sequence as well, but are not necessarily performed in sequence. For example, the order of respective operations may be changed as well, and at least two operations may be performed in parallel as well. Herein, the electronic device may be the electronic device 101 of FIG. 1, the electronic device 101 of FIG. 2, and/or the electronic device 101 of FIG. 3.

Referring to FIG. 8, in operation 801, the electronic device (e.g., the processor 320) of various embodiments may notify that a connection with the second external device 105 fails. According to an embodiment, the processor 320 of the electronic device may control the display device 360 to display information (e.g., a connection failure message or a connection failure symbol) indicating that a connection of the first external device 103 has been made, but a connection of the second external device 105 being a group device of the first external device 103 has failed.

According to various embodiments, in operation 803, the electronic device (e.g., the processor 320) may sense an event for re-registering a group device of the first external device 103. According to an embodiment, the processor 320 of the electronic device may display a message of inquiring whether to register a new external device as the group device of the first external device 103, and may sense a user input of requesting a registration of the new external device, thereby sensing the event for re-registering (or changing) the group device of the first external device 103. According to an embodiment, the information indicating that the connection of the second external device 105 has failed and the message of inquiring whether to register the new external device as the group device of the first external device 103 may be displayed at the same time.

According to various embodiments, in operation 805, the electronic device (e.g., the processor 320) may search the third external device 201 through scan. According to an embodiment, in response to the event for re-registering the group device of the first external device 103 being sensed, the processor 320 of the electronic device may search the third external device 201 that is a new external device. For example, the processor 320 of the electronic device may receive an advertising signal (or packet) of the third external device 201 through scan, thereby searching the third external device 201 that is the new external device. According to an embodiment, the third external device 201 may be searched in a scan duration for a short-range wireless communication connection with the first external device 103 and/or the second external device 105. In response to the third external device 201 being searched in the scan duration for the short-range wireless communication connection with the first external device 103 and/or the second external device 105, the processor 320 of the electronic device may omit the scan operation for searching the third external device 201.

According to various embodiments, in operation 807, the electronic device (e.g., the processor 320) may identify whether the searched third external device 201 is available as a group device of the first external device 103. According to an embodiment, the processor 320 of the electronic device may identify whether the third external device 201 is available as the group device of the first external device 103, based on equipment information of the searched third external device 201 and/or a user input. For example, the processor 320 of the electronic device may provide a user interface of inquiring whether to use the searched third external device 201 as the group device of the first external device 103, and may receive a user input indicating whether to use the third external device 201 as the group device of the first external device 103. The user interface of inquiring whether to use the third external device 201 as the group device of the first external device 103 may include the equipment information of the third external device 201. In another example, the processor 320 of the electronic device may compare the equipment information of the searched third external device 201 and the equipment information of the first external device 103, to identify whether to use the third external device 201 as the group device of the first external device 103. For instance, in response to the equipment information of the searched third external device 201 and the equipment information of the first external device 103 being consistent with each other, the processor 320 of the electronic device may identify that the third external device 201 is available as the group device of the first external device 103.

According to various embodiments, in response to the third external device 201 being available as the group device of the first external device 103, in operation 809, the electronic device (e.g., the processor 320) may perform a short-range wireless communication connection with the third external device 201. The operation of performing the short-range wireless communication connection with the third external device 201 may be the same as the above-mentioned operation 605 of FIG. 6.

According to various embodiments, in operation 811, the electronic device (e.g., the processor 320) may obtain information about the third external device 201. According to an embodiment, the processor 320 of the electronic device may obtain address information of the third external device 201 from at least one signal received from the third external device 201.

According to various embodiments, in response to the third external device 201 not being available as the group device of the first external device 103, in operation 813, the electronic device (e.g., the processor 320) may notify that the group device search has failed. According to an embodiment, the processor 320 of the electronic device may control the display device 360 to display information indicating that the new external device available as the group device of the first external device 103 has not been searched.

Figure 9:
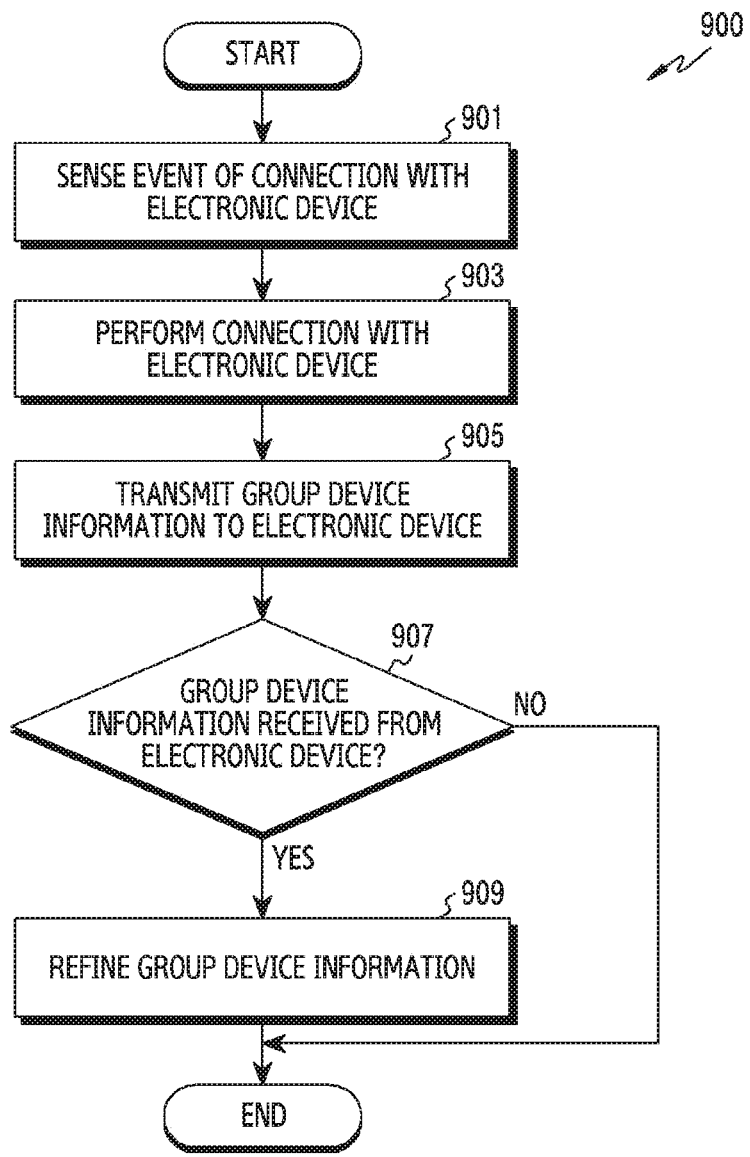
FIG. 9 illustrates a flowchart for connecting with an electronic device in an external device of various embodiments.

FIG. 9 illustrates a flowchart 900 for connecting with an electronic device in an external device of various embodiments. In an embodiment below, respective operations may be performed in sequence as well, but are not necessarily performed in sequence. For example, the order of respective operations may be changed as well, and at least two operations may be performed in parallel as well. Herein, the external device may be the first external device 103 of FIG. 1 and/or FIG. 2, the second external device 105, the third external device 201, and/or the external device 401 of FIG. 4, and the electronic device may be the electronic device 101 of FIG. 1, the electronic device 101 of FIG. 2, and/or the electronic device 301 of FIG. 3.

Referring to FIG. 9, in operation 901, the external device (e.g., the processor 420) of various embodiments may sense an event for connection with the electronic device (e.g., the electronic device 301). According to an embodiment, the processor 420 of the external device 401 may sense an event for connecting with the electronic device 301 through short-range wireless communication, on the basis of a user input. For example, the processor 420 of the external device 401 may sense the user input through the input device 440, and may sense that the event for connecting with the electronic device 301 through the short-range wireless communication has occurred, on the basis of the user input.

According to various embodiments, in operation 903, the external device (e.g., the processor 420) may perform a connection with the electronic device 301. According to an embodiment, in response to the event for connection to the electronic device being sensed, the processor 420 of the external device 401 may activate the short-range wireless communication module, and may transmit, through the short-range wireless communication module, a signal indicating that the external device 401 is in a state of being connectable through the short-range wireless communication. For example, the processor 420 of the external device 401 may transmit an advertising signal including equipment information of the external device 401, thereby performing a short-range wireless communication connection with the electronic device 301 having received the advertising signal.

According to various embodiments, in operation 905, the external device (e.g., the processor 420) may transmit information of a group device to the electronic device. According to an embodiment, the processor 420 of the external device 401 may transmit address information of the group device stored in the memory 430 of the external device 401 to the electronic device 301 connected with the external device 401. According to an embodiment, in response to information of a plurality of other external devices being stored as the group device information in the memory 430, the processor 420 of the external device 401 may select information of at least one another external device among the information of the plurality of other external devices, based on at least one of time information or location information, and may transmit the selected information of the at least one another external device to the electronic device 301. For example, the processor 420 of the external device 401 may select the information of the at least one another external device, based on at least one of time information indicating a time point of connecting with the electronic device 301, location information (e.g., location information of the electronic device 301 or location information of the external device 401) corresponding to the time point of connecting with the electronic device 301, or time information and/or location information associated with the information of the plurality of other external devices stored in the memory 430. According to an embodiment, the processor 420 of the external device 401 may transmit address information of a group device of the external device 401 to the electronic device 301 through a short-range wireless communication connection between the external device 401 and the electronic device 301, or may transmit the address information of the group device of the external device 401 to the electronic device 301 using another communication scheme. For example, in response to the external device 401 and the electronic device 301 being connected with each other using Bluetooth, the processor 420 of the external device 401 may transmit group device information of the external device 401 to the electronic device 301 by using the connected Bluetooth. In another example, in response to the external device 401 and the electronic device 301 being connected with each other using Bluetooth, the processor 420 of the external device 401 may transmit the group device information of the external device 401 to the electronic device 301 by using NFC. According to an embodiment, the information of the group device of the external device 401 may be included and transmitted in the advertising signal in operation 903. In this case, operation 905 may be omitted.

According to various embodiments, in operation 907, the external device (e.g., the processor 420) may identify whether information of a group device of the external device 401 is received from the electronic device 301. According to an embodiment, the processor 420 of the external device 401 may receive a group device information refining request signal including the information of the group device of the external device 401 from the electronic device 301 in a state of being connected with the electronic device 301.

According to various embodiments, in operation 909, the external device (e.g., the processor 420) may update the information of the group device of the external device 401. According to an embodiment, in response to the information of the group device of the external device 401 being received from the electronic device 301, the processor 420 of the external device 401 may refine the group device information of the external device 401, based on the received information of the group device of the external device 401. For example, the processor 420 of the external device 401 may delete group device information previously stored in the memory 430 of the external device 401, and may store the group device information received from the electronic device 301, as the group device information of the external device 401. In another example, the processor 420 of the external device 401 may additionally store the group device information received from the electronic device 301, as the group device information of the external device 401, without deleting the group device information previously stored in the memory 430 of the external device 401. According to an embodiment, the group device information stored in the memory 430 may include time information and/or location information associated with a corresponding another external device. The time information and/or location information may include at least one of a time and/or location at which a corresponding at least one another external device is registered to the electronic device 301, a time and/or location at which the external device 401 receives address information of the corresponding at least one another external device, or a time and/or location configured by a user.

Figure 10:
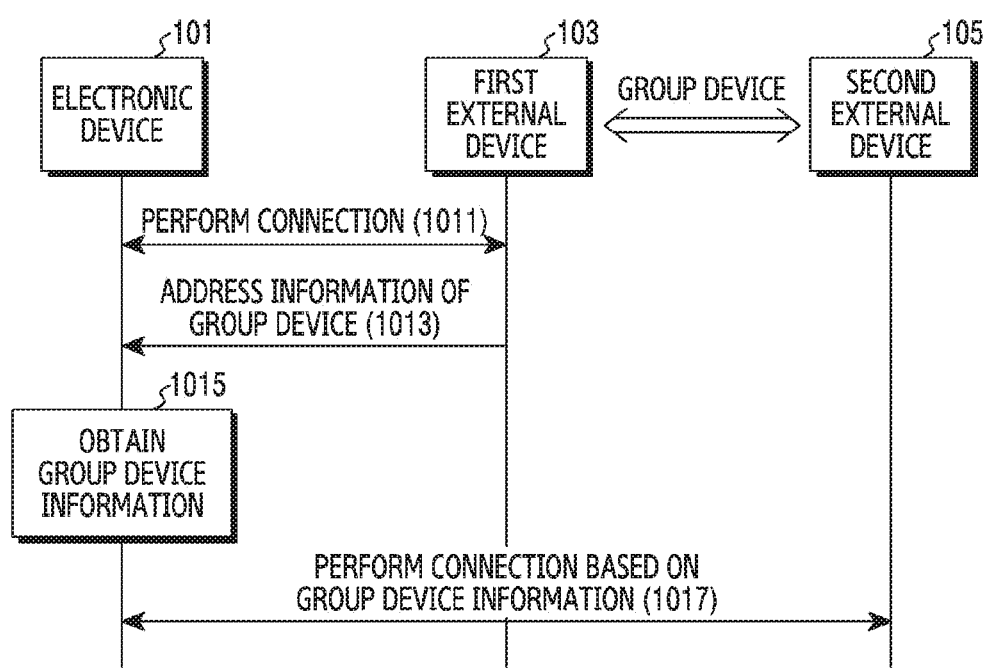
FIG. 10 illustrates a signal flow for connection between an electronic device and external devices used in a group, of various embodiments.

FIG. 10 illustrates a signal flow for connection between an electronic device and external devices used in a group, of various embodiments. In an embodiment below, respective operations may be performed in sequence as well, but are not necessarily performed in sequence. For example, the order of respective operations may be changed as well, and at least two operations may be performed in parallel as well. Herein, the electronic device 101 may be the electronic device 101 of FIG. 1, the electronic device 101 of FIG. 2, and/or the electronic device 301 of FIG. 3. The first external device 103 may be the first external device 103 of FIG. 1, the first external device 103 of FIG. 2, and/or the external device 401 of FIG. 4. The second external device 105 may be the second external device 105 of FIG. 1, the second external device 105 of FIG. 2, and/or the external device 401 of FIG. 4.

Referring to FIG. 10, in operation 1011, the electronic device 101 and the first external device 103 of various embodiments may perform a connection through short-range wireless communication. According to an embodiment, the electronic device 101 may perform a scan operation, and the first external device 103 may transmit a signal indicating that the first external device 103 is in a state of being connectable through short-range wireless communication. According to an embodiment, the electronic device 101 may identify that the first external device 103 is an external device connectable with the electronic device 101, based on a user input, and may perform a short-range wireless communication connection with the first external device 103.

According to various embodiments, in operation 1013, the first external device 103 may transmit address information of a group device of the first external device 103 to the electronic device 101 connected through the short-range wireless communication. For example, the first external device 103 may transmit address information of the second external device 105 being a group device of the first external device 103, to the electronic device 101. According to an embodiment, the first external device 103 may transmit the address information of the second external device 105 being the group device of the first external device 103, to the electronic device 101 through a signal of operation 1011.

According to various embodiments, in operation 1015, the electronic device 101 may obtain the group device information of the first external device 103 from the first external device 103. In operation 1017, the electronic device 101 may perform a communication connection with the second external device 105, based on the group device information of the first external device 103.

Figure 11:
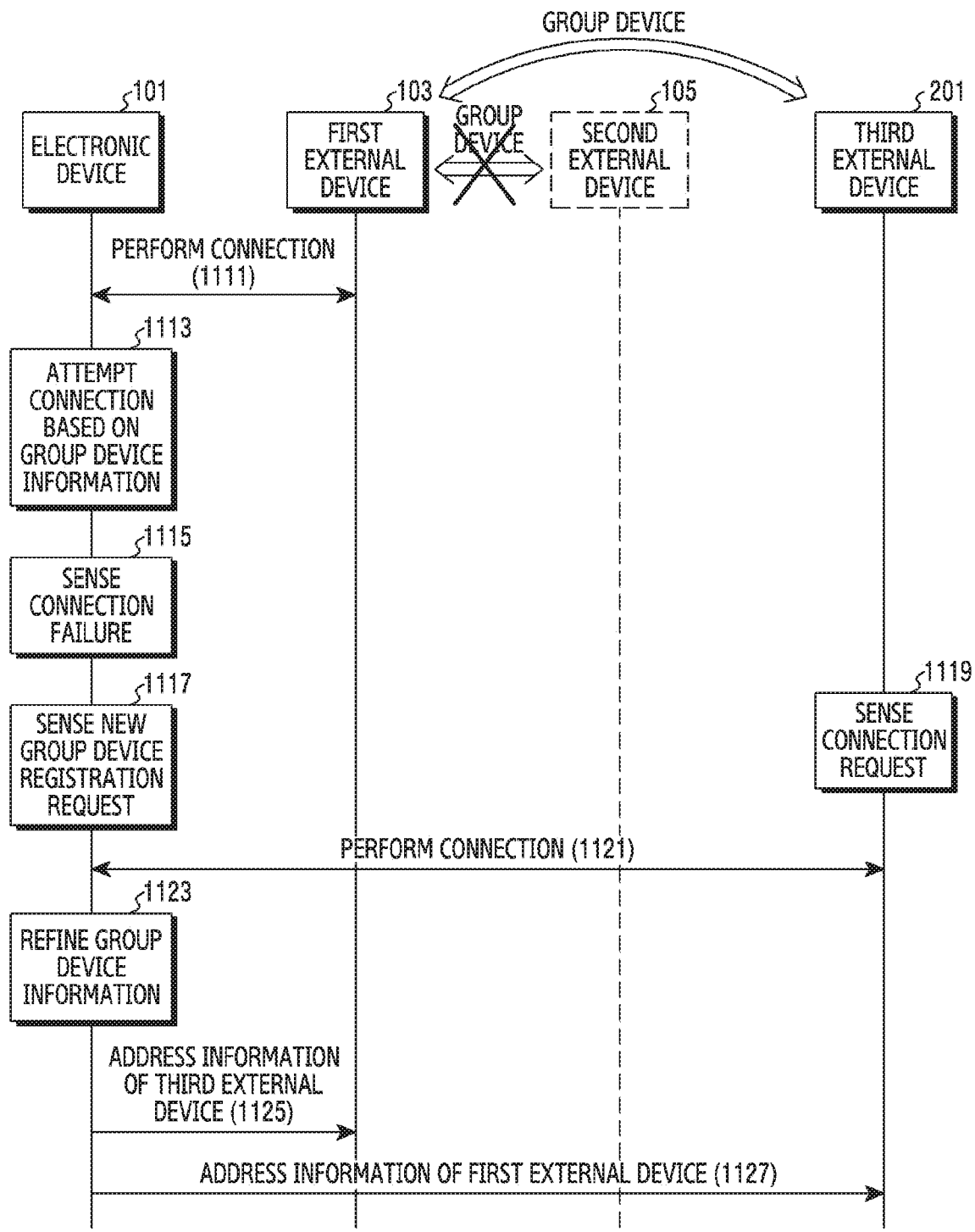
FIG. 11 illustrates a signal flow for configuring a new external device as a group device of a previously connected external device, of various embodiments.

FIG. 11 illustrates a signal flow for configuring a new external device as a group device of a previously connected external device, of various embodiments. In an embodiment below, respective operations may be performed in sequence as well, but are not necessarily performed in sequence. For example, the order of respective operations may be changed as well, and at least two operations may be performed in parallel as well. Herein, the electronic device 101 may be the electronic device 101 of FIG. 1, the electronic device 101 of FIG. 2, and/or the electronic device 301 of FIG. 3. The first external device 103 may be the first external device 103 of FIG. 1, the first external device 103 of FIG. 2, and/or the external device 401 of FIG. 4. The second external device 105 may be the second external device 105 of FIG. 1, the second external device 105 of FIG. 2, and/or the external device 401 of FIG. 4. The third external device 201 may be the third external device 201 of FIG. 2, and/or the external device 401 of FIG. 4.

Referring to FIG. 11, in operation 1111, the electronic device 101 and the first external device 103 of various embodiments may perform a connection through short-range wireless communication. According to an embodiment, the electronic device 101 may perform a scan operation, and the first external device 103 may transmit a signal indicating that the first external device 103 is in a state of being connectable through the short-range wireless communication. According to an embodiment, the electronic device 101 may identify that the first external device 103 is an external device connectable with the electronic device 101, based on previously registered connectable information, and may perform a short-range wireless communication connection with the first external device 103.

According to various embodiments, in operation 1113, the electronic device 101 may attempt a connection with the second external device 105, based on group device information of the first external device 103. According to an embodiment, the electronic device 101 may attempt the connection with the second external device 105, based on group device information of the previously registered first external device 103, and/or group device information received from the first external device 103 after being connected with the first external device 103 through short-range wireless communication.

According to various embodiments, in operation 1115, the electronic device 101 may sense that a connection to a group device of the first external device 103 has failed. According to an embodiment, in response to a signal including the same information as the group device information of the first external device 103 not being received within a given time through a scan operation, the electronic device 101 may identify that the connection to the group device of the first external device 103 has failed.

According to various embodiments, in operation 1117, the electronic device 101 may sense a request for registering a new external device as the group device of the first external device 103. For example, the electronic device 101 may sense that an event for configuring the new external device as the group device of the first external device 103 takes place, based on a user input.

According to various embodiments, in operation 1119, the third external device 201 may sense a request for a short-range wireless communication connection with the electronic device 101. For example, the third external device 201 may sense that an event of requesting the short-range wireless communication connection with the electronic device 101 takes place, based on a user input.

According to various embodiments, in operation 1121, the electronic device 101 and the third external device 201 may perform the short-range wireless communication connection. According to an embodiment, the electronic device 101 may perform a scan operation, and the third external device 201 may transmit a signal indicating that the third external device 201 is in a state of being connectable through short-range wireless communication. According to an embodiment, the electronic device 101 may identify that the third external device 201 is an external device connectable with the electronic device 101, based on a user input, and may perform the short-range wireless communication connection with the third external device 201. According to an embodiment, the electronic device 101 may identify that the third external device 201 is an external device connectable with the electronic device 101, based on equipment information of the third external device 201 and equipment information of the first external device 103, and may perform the short-range wireless communication connection with the third external device 201.

According to various embodiments, in operation 1123, the electronic device 101 may refine the group device information of the first external device 103, based on the information of the third external device 201. According to various embodiments, in operation 1125, the electronic device 101 may transmit address information of the third external device to the first external device 103 and in operation 1127, may transmit address information of the first external device to the third external device 201. According to an embodiment, the first external device 103 may store the address information of the third external device 201 as the group device information of the first external device 103, and may store the address information of the first external device 103 as the group device information of the third external device 201.

According to various embodiments, a method for operating in an electronic device may include connecting with a first external device, and attempting a connection with a second external device, based at least on group device information of the first external device, and connecting with a third external device, based at least on a failure of connection with the second external device, and refining the group device information of the first external device, based at least on information of the connected third external device.

According to various embodiments, attempting the connection with the second external device may include receiving address information of the second external device that is a group device of the first external device from the first external device, and performing a short-range wireless communication connection with the second external device, based on the address information of the second external device received from the first external device.

According to various embodiments, refining the group device information of the first external device may include refining the group device information of the first external device based on address information of the third external device, and transmitting the refined group device information of the first external device to the first external device.

According to various embodiments, refining the group device information of the first external device may include determining group device information of the third external device based on address information of the first external device, and transmitting the determined group device information of the third external device to the third external device.

According to various embodiments, connecting with the third external device may include searching at least one external device through the communication interface, based at least on the failure of connection with the second external device, and selecting one of the at least one external device as the third external device, based on equipment information of the at least one external device, and performing a short-range wireless communication connection with the selected third external device. The equipment information may include at least one of a model name, an equipment name, manufacturing company information, or a universally unique identifier (UUID).

According to various embodiments, selecting one of the at least one external device as the third external device may include displaying, on a display, the equipment information of the at least one external device, and selecting one of the at least one external device as the third external device, based on a user input for the displayed information.

According to various embodiments, connecting with the third external device may include displaying a failure of connection to a group device of the first external device on the display, based at least on the failure of connection with the second external device, and sensing an event for registering a new external device as the group device of the first external device on the basis of a user input, and in response to the event sensing, searching the third external device.

According to various embodiments, a method for operating in an external device may include connecting with an electronic device through a communication interface, and receiving group device information of the external device from the electronic device, through the communication interface, and refining information about a group device of the external device, based on the received group device information.

According to various embodiments, the group device information may include address information about the group device of the external device.

According to various embodiments, the method may further include transmitting information about the group device of the external device to the connected electronic device.

According to various embodiments of the present disclosure, an electronic device may receive information about a group device (e.g., pair device) from at least one external device connected to the electronic device among external devices used in a group (e.g., pair), and automatically connect with the at least one another external device, based on the received information about the group device, thereby improving the efficiency of external device connection.

According to various embodiments of the present disclosure, the electronic device may refine information of a group device of one external device, based on information of a new external device, in a state of connecting with only one external device among external devices used in a group, thereby simply and conveniently configuring and registering the new external device as a group device of another external device without using a separate software tool in a condition in which another external device cannot be used because of a loss, a malfunction or the like.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 340) including one or more instructions that are stored in a storage medium (e.g., internal memory 336 or external memory 338) that is readable by a machine (e.g., the electronic device 301). For example, a processor (e.g., the processor 320) of the machine (e.g., the electronic device 301) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Although the present disclosure has been described with various embodiments, various changes and modifications may be suggested to one skilled in the art. It is intended that the present disclosure encompass such changes and modifications as fall within the scope of the appended claims

What is claimed is:

1. An electronic device comprising:
    a communication interface; and
    a processor configured to:
        attempt a connection with a second external device through the communication interface based at least on group device information of a first external device being connected to the electronic device,
        connect with a third external device through the communication interface based at least on a failure to connect with the second external device,
        update the group device information of the first external device based at least on address information of the connected third external device, and
        transmit the updated group device information of the first external device to the first external device through the communication interface.

2. The electronic device of claim 1, wherein the processor is configured to:
    receive address information of the second external device from the first external device through the communication interface, wherein the second external device is a group device of the first external device; and
    perform a short-range wireless communication connection with the second external device based on the address information of the second external device being received from the first external device.

3. The electronic device of claim 2, wherein the processor is configured to:
    determine group device information of the third external device based on address information of the first external device; and
    transmit the determined group device information of the third external device to the third external device through the communication interface.

4. The electronic device of claim 1, wherein the processor is configured to:
    search at least one external device through the communication interface based at least on the failure to connect with the second external device;
    select one of the at least one external device as the third external device based on equipment information of the at least one external device; and
    perform a short-range wireless communication connection with the selected third external device through the communication interface.

5. The electronic device of claim 4, wherein the equipment information comprises at least one of a model name, an equipment name, manufacturing company information, or a universally unique identifier (UUID).

6. The electronic device of claim 4, further comprising a display, wherein the processor is configured to:
    display, on the display, the equipment information of the at least one external device; and select one of the at least one external device as the third external device based on a user input for the displayed equipment information.

7. The electronic device of claim 1, further comprising a display, wherein the processor is configured to display a message indicating a failure to connect to a group device of the first external device on the display based at least on the failure to connect with the second external device.

8. The electronic device of claim 1, wherein the processor is configured to:
sense an event for registering a new external device as a group device of the first external device based on a user input, wherein the user input is based at least on the failure to connect with the second external device, and
in response to sensing the event, search the third external device through the communication interface.

9. The electronic device of claim 1, wherein the processor is configured to use the third external device as a group device of the first external device.

10. An external device, comprising:
a communication interface;
a processor; and
a memory storing instructions that, when executed by the processor, cause the processor to:
connect with an electronic device through the communication interface,
receive group device information of the external device from the electronic device through the communication interface, and
update information about a group device of the external device based on the received group device information,
wherein the received group device information of the external device is updated based on address information of another external device connected to the electronic device.

11. The external device of claim 10, wherein the group device information comprises address information about the group device of the external device.

12. The external device of claim 10, wherein the memory stores instructions that, when executed by the processor, cause the processor to:
perform a short-range wireless communication connection with the electronic device through the communication interface; and
transmit information about the group device of the external device to the connected electronic device.

13. The external device of claim 12, wherein the memory stores instructions that, when executed by the processor, cause the processor to:
select at least one another external device among a plurality of other external devices registered as the group device of the external device based at least on time information or location information; and
transmit information about the selected at least one another external device to the connected electronic device.

14. A method for operating in an electronic device, the method comprising:
connecting with a first external device;
attempting a connection with a second external device based at least on group device information of the first external device;
connecting with a third external device based at least on a failure to connect with the second external device;
updating the group device information of the first external device based at least on address information of the connected third external device; and
transmitting the updated group device information of the first external device to the first external device.

15. The method of claim 14, wherein attempting to connect with the second external device comprises:
receiving address information of the second external device from the first external device, wherein the second external device is a group device of the first external device; and
performing a short-range wireless communication connection with the second external device based on the address information of the second external device received from the first external device.

16. The method of claim 15, wherein updating the group device information of the first external device comprises:
determining group device information of the third external device based on address information of the first external device; and
transmitting the determined group device information of the third external device to the third external device.

17. The method of claim 14, wherein connecting with the third external device comprises:
searching at least one external device through a communication interface based at least on the failure to connect with the second external device;
selecting one of the at least one external device as the third external device based on equipment information of the at least one external device; and
performing a short-range wireless communication connection with the selected third external device,
wherein the equipment information comprises at least one of a model name, an equipment name, manufacturing company information, or a universally unique identifier (UUID).

18. The method of claim 14, wherein connecting with the third external device comprises:
displaying a message indicating a failure to connect to a group device of the first external device on the display based at least on the failure to connect with the second external device;
sensing an event for registering a new external device as the group device of the first external device based on a user input; and
in response to sensing the event, searching the third external device.

* * * * *